United States Patent
Faccin et al.

(10) Patent No.: US 10,512,112 B1
(45) Date of Patent: *Dec. 17, 2019

(54) METHOD AND APPARATUS FOR SUPPORTING MULTIPLE CONNECTIONS OVER DIFFERENT TYPES OF ACCESS IN 3GPP SYSTEMS

(71) Applicant: Marvell International Ltd., Hamilton (BM)

(72) Inventors: Stefano Faccin, Hayward, CA (US); Fan Zhao, San Jose, CA (US); Ameya Damle, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 19 days.

This patent is subject to a terminal disclaimer.

(21) Appl. No.: 15/688,564

(22) Filed: Aug. 28, 2017

Related U.S. Application Data

(63) Continuation-in-part of application No. 15/145,223, filed on May 3, 2016, now Pat. No. 9,750,071, which
(Continued)

(51) Int. Cl.
| | |
|---|---|
| *H04W 4/00* | (2018.01) |
| *H04W 76/15* | (2018.01) |
| *H04L 29/08* | (2006.01) |
| *H04L 12/707* | (2013.01) |
| *H04W 8/08* | (2009.01) |

(Continued)

(52) U.S. Cl.
CPC .............. *H04W 76/15* (2018.02); *H04L 45/24* (2013.01); *H04L 67/2857* (2013.01); *H04W 8/085* (2013.01); *H04W 40/24* (2013.01); *H04W 88/06* (2013.01)

(58) Field of Classification Search
CPC ..................................................... H04W 76/15
See application file for complete search history.

(56) References Cited

U.S. PATENT DOCUMENTS

| | | |
|---|---|---|
| 8,160,038 B1 | 4/2012 | Zhao et al. |
| 8,599,790 B1 | 12/2013 | Damle et al. |

(Continued)

OTHER PUBLICATIONS

"Final Office Action", U.S. Appl. No. 12/536,962, dated Mar. 27, 2012, 14 pages.

(Continued)

*Primary Examiner* — Gerald A Smarth

(57) ABSTRACT

A method and apparatus for routing packets from a home agent to a user equipment through a first access network and a second access network. The method includes sending a first binding update message from the user equipment over the first access network to create a first binding cache entry at the home agent. The user equipment uses a home address assigned to the user equipment as a source IP address of the first binding update message. The method further includes sending a second binding update message from the user equipment over the second access network to create a second binding cache entry at the home agent. The user equipment receives packets from the home agent through the first access network and the second access network based on the first binding cache entry and the second binding cache entry.

17 Claims, 18 Drawing Sheets

| BINDING CACHE | | | |
|---|---|---|---|
| HOA1 | COA1<br>BID1 | COA2<br>BID2 | |
| HOA2 | COA | | |

Related U.S. Application Data is a continuation of application No. 14/071,258, filed on Nov. 4, 2013, now Pat. No. 9,338,812, which is a continuation of application No. 12/536,962, filed on Aug. 6, 2009, now Pat. No. 8,681,739.

(60) Provisional application No. 61/086,632, filed on Aug. 6, 2008.

(51) Int. Cl.
  *H04W 88/06* (2009.01)
  *H04W 40/24* (2009.01)

(56) References Cited

U.S. PATENT DOCUMENTS

| | | | |
|---|---|---|---|
| 8,681,739 | B1 | 3/2014 | Zhao et al. |
| 9,338,812 | B1 | 5/2016 | Faccin et al. |
| 9,750,071 | B1 | 8/2017 | Faccin et al. |
| 2002/0006133 | A1 | 1/2002 | Kakemizu et al. |
| 2002/0015395 | A1* | 2/2002 | Karagiannis ............ H04L 47/724 370/338 |
| 2002/0080752 | A1 | 6/2002 | Johansson et al. |
| 2004/0105420 | A1 | 6/2004 | Takeda et al. |
| 2005/0078632 | A1 | 4/2005 | Aramaki et al. |
| 2005/0094606 | A1 | 5/2005 | Adrangi et al. |
| 2005/0144320 | A1* | 6/2005 | Jagana ............... H04L 29/12264 709/245 |
| 2005/0265276 | A1 | 12/2005 | Takeda et al. |
| 2006/0133316 | A1* | 6/2006 | Jagana .................. H04W 76/19 370/331 |
| 2006/0133337 | A1 | 6/2006 | An et al. |
| 2006/0140164 | A1* | 6/2006 | Patel .................. H04L 29/12301 370/338 |
| 2006/0251044 | A1 | 11/2006 | Haddad |
| 2007/0081512 | A1 | 4/2007 | Takeda et al. |
| 2007/0291717 | A1* | 12/2007 | Williams ................ H04W 8/06 370/338 |
| 2008/0253382 | A1 | 10/2008 | Bachmann et al. |
| 2008/0256220 | A1* | 10/2008 | Bachmann ............. H04W 8/04 709/222 |
| 2009/0019180 | A1 | 1/2009 | Aso et al. |
| 2009/0052425 | A1 | 2/2009 | Aso et al. |
| 2009/0080387 | A1 | 3/2009 | Dell'Uomo et al. |
| 2009/0080441 | A1 | 3/2009 | Krishnan et al. |
| 2009/0161558 | A1 | 6/2009 | Hirano et al. |
| 2009/0265453 | A1 | 10/2009 | Hirano et al. |
| 2011/0103260 | A1 | 5/2011 | Jeyatharan et al. |

OTHER PUBLICATIONS

"Non-Final Office Action", U.S. Appl. No. 12/536,962, dated Oct. 11, 2011, 9 pages.

"Non-Final Office Action", U.S. Appl. No. 14/071,258, dated Sep. 1, 2015, 17 pages.

"Non-Final Office Action", U.S. Appl. No. 15/145,223, dated Sep. 9, 2016, 12 pages.

"Notice of Allowance", U.S. Appl. No. 14/071,258, dated Jan. 15, 2016, 8 pages.

"Notice of Allowance", U.S. Appl. No. 15/145,223, dated Apr. 25, 2017, 8 pages.

"Notice of Allowance", U.S. Appl. No. 12/536,962, dated Jun. 27, 2013, 16 pages.

\* cited by examiner

| BINDING CACHE |||  |
|---|---|---|---|
| HOA1 | COA1<br>BID1 | COA2<br>BID2 |  |
| HOA2 | COA |  |  |
FIG. 3
FIG. 4
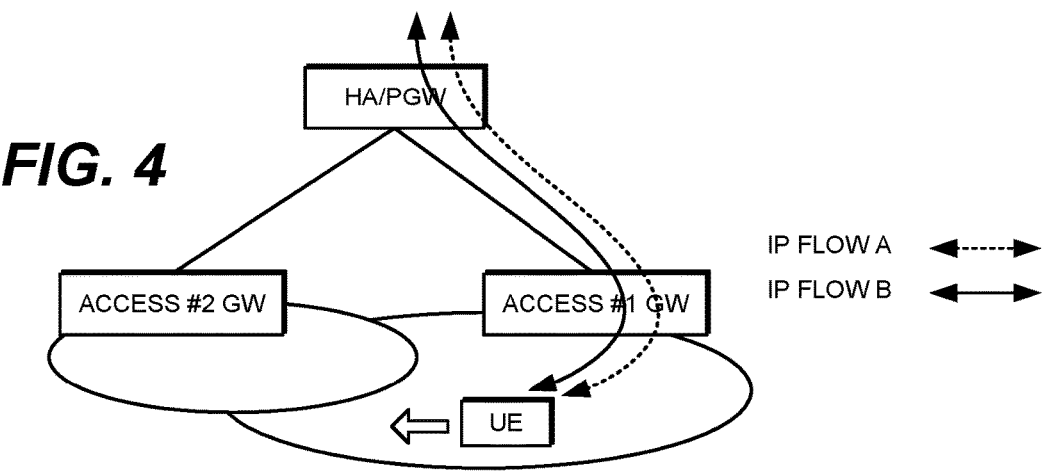
IP FLOW A
IP FLOW B
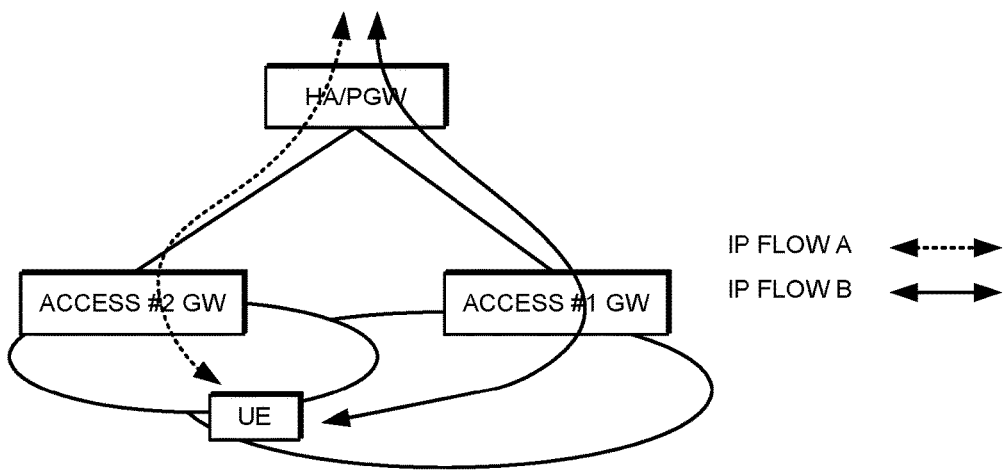
IP FLOW A
IP FLOW B
FIG. 5

```
 0                   1                   2                   3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |           Sequence #          |
+-+-+-+-+-+-+-+-+-+-+-+-+-+-+-+-+-+-+-+-+-+-+-+-+-+-+-+-+-+-+-+-+
|A|H|L|K|M|R|P|F|    Reserved   |           Lifetime            |
+-+-+-+-+-+-+-+-+-+-+-+-+-+-+-+-+-+-+-+-+-+-+-+-+-+-+-+-+-+-+-+-+
|                                                               |
.                                                               .
.                       Mobility options                        .
.                                                               .
|                                                               |
+-+-+-+-+-+-+-+-+-+-+-+-+-+-+-+-+-+-+-+-+-+-+-+-+-+-+-+-+-+-+-+-+
```
FIG. 11
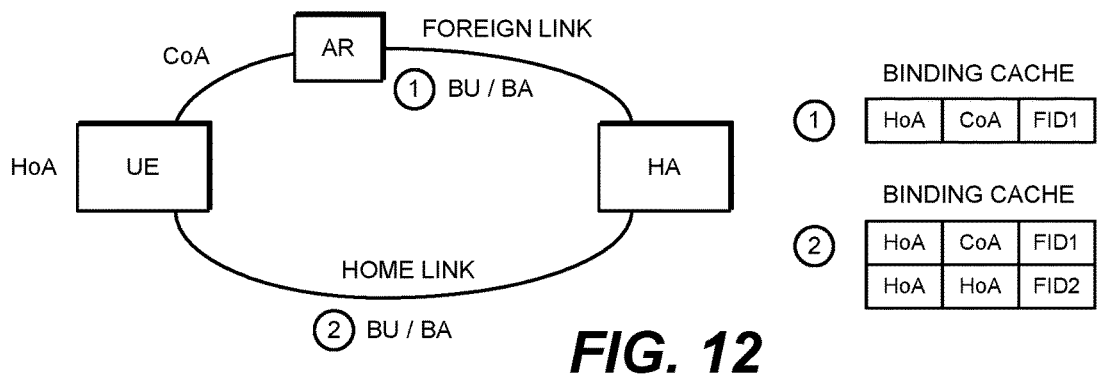
FIG. 12
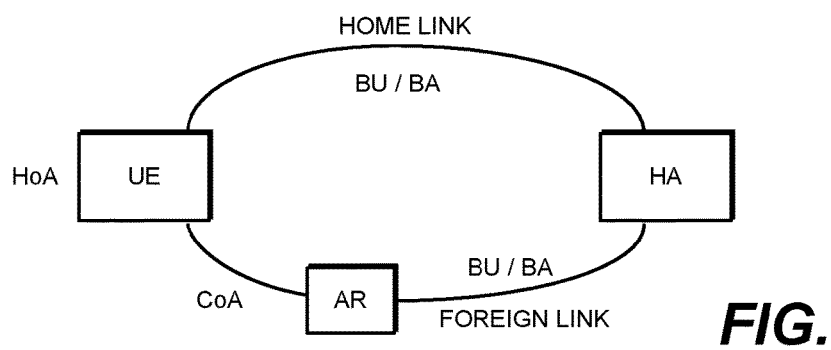
FIG. 13

METHOD AND APPARATUS FOR SUPPORTING MULTIPLE CONNECTIONS OVER DIFFERENT TYPES OF ACCESS IN 3GPP SYSTEMS

CROSS-REFERENCE TO RELATED APPLICATIONS

The present disclosure is a continuation of and claims priority to U.S. patent application Ser. No. 15/145,223, filed May 3, 2016, now U.S. Pat. No. 9,750,071 issued Aug. 29, 2017, which is a continuation of and claims priority to U.S. patent application Ser. No. 14/071,258, filed Nov. 4, 2013, now U.S. Pat. No. 9,338,812, issued May 10, 2016, which is a continuation of and claims priority to U.S. patent application Ser. No. 12/536,962, filed Aug. 6, 2009, now U.S. Pat. No. 8,681,739, issued Mar. 25, 2014, which claims the benefit of U.S. Provisional Patent Application No. 61/086,632, filed Aug. 6, 2008, which are incorporated herein by reference.

FIELD

The present disclosure generally relates to wireless networks.

BACKGROUND

The 3rd Generation Partnership Project (3GPP) is a collaboration between groups of telecommunications associations, to make a globally applicable third generation (3G) mobile phone system specification within the scope of the International Mobile Telecommunications-2000 project of the International Telecommunication Union (ITU). FIG. 1 illustrates a 3GPP architecture for multiple access in a non-roaming scenario, and FIG. 2 illustrates a 3GPP architecture for multiple access in a roaming scenario. The architectures depicted in FIGS. 1 and 2 show the scenarios in which a client-based mobility protocol S2c—i.e., DSMIPv6 (Dual stack Mobile IPv6)—is used for connectivity and mobility between 3GPP accesses and non-3GPP accesses. S2c is described in more detail in 3GPP TS 23.402, which is incorporated herein by reference. The mechanisms specified in 3GPP TS 23.402 can be used to connect a user equipment (UE) (or mobile terminal) in parallel to an evolved packet core (EPC) via a 3GPP access network and a non-3GPP access network towards different packet data networks (PDNs).

Two Internet Engineering Task Force (IETF) specifications—IETF draft-ietf-monami6-multiplecoa-08, and IETF draft-ietf-mext-flow-binding-00a—describe techniques for supporting multiple IP flows over different accesses. The techniques are based on Extensions to DSMIPv6 where a UE can perform multiple CoA (Care-of Address) registrations for the same HoA (Home Address) with the HA (Home Agent), and traffic is routed to the different CoAs based on flow binding (i.e., traffic descriptors that filter the traffic and route the traffic to the correct CoAs—downlink packets addresses to the UE are received by the HA, the filters are applied, and packets are routed towards the CoA corresponding to the matching filter). It is therefore possible to extend S2c in 3GPP (i.e., the interface based on DSMIPv6) in order to allow a UE to be connected simultaneously to the same PDN via different accesses and to move IP flows between the different accesses.

Specifically, the techniques include the following features. Multiple DSMIPv6 CoAs registrations occur at the DSMIPv6 level with the HA (Home Agent)/PGW (PDN Gateway). The different CoAs are obtained over different access networks. The different CoAs are then used simultaneously by the UE. One Binding Cache Entry (BCE) is created for each CoA. The mapping between HoA and CoA is no more a one-to-one but one to many. DSMIPv6 BUs (Binding Update messages) can contain more than one CoAs. A BID (Binding Identifier) is used to univocally identify the HoA-CoA mapping. A BU (Binding Update) contains as many BID options as the number of CoAs in the BU. DSMIPv6 BUs can contain description of flows associated with each CoA. Each BU can contain a FID (Flow ID) option. The FID option includes a flow identifier and a flow description and a pointer to the respective BID. The routing of UL (uplink) and DL (downlink) packets is performed based on these associations. For example, FIG. 3 illustrates an example binding cache in a home agent (HA)/packet data network gateway (PGW) when multiple CoAs are registered for the same HoA with different binding descriptors.

The techniques described in the IETF specifications mentioned above, however, do not apply completely to 3GPP networks. In fact, in 3GPP some accesses (typically the 3GPP specific access technologies, e.g., WCDMA or LTE) are considered "home link" from a DSMIPv6 point of view. What that means is that the UE, when connected over such access technologies, shall not use a DSMIPv6 tunnel to obtain connectivity. This is represented in FIGS. 1 and 2 by the presence of a dotted line S2c interface (e.g., DSMIPv6) that indicates that only DSMIPv6 signaling can be exchanged over 3GPP accesses, but no DSMIPv6 tunneling is used. FIGS. 4 and 5 respectively illustrate this scenario.

In FIG. 4, Access #1 corresponds to the home link for the UE from a DSMIPv6 perspective (e.g., Access #1 is the serving gateway in a 3GPP architecture), and Access #2 is not the home link. Because the UE is on the home link, no CoA is assigned to the UE and, therefore, there are no mappings between an HoA and CoAs. Accordingly, both IP flows A and B are routed through Access #1. In FIG. 5, Access #1 corresponds to the home link for the UE from a DSMIPv6 perspective (e.g., Access #1 is the serving gateway in a 3GPP architecture), and Access #2 is not the home link. For IP flow B, the UE is on the home link for DSMIPv6, therefore, no CoA is assigned. For IP flow A, the UE is not on the home link for DSMIPv6, therefore, a CoA1 is assigned. A mapping between the HoA and CoA1 must be created (including traffic filters/descriptors) at the HA/PGW.

Current techniques for providing multiple accesses to a UE are based on the idea that when a UE is connected to a PDN over two accesses, the UE is assigned one CoA over each access. In practice, there is presently no way to allow a BCE (binding cache entry) that would have flow descriptors for directing traffic either to the CoA or to the HoA, since no BCE is created unless there is a CoA, and therefore an entry for the HoA cannot be created. In FIGS. 1 and 2 the UE is connected on the home link when the UE is using a 3GPP access, and is not on the home link when using a non-3GPP access. In such scenario the UE is provided connectivity either using PMIPv6 (Proxy Mobile IPv6) over an S5 interface, or the GTP (GPRS Transport Protocol) protocol.

An additional scenario is when a UE can also be connected via two-home links is shown in FIG. 6. As shown in FIG. 6, IP flow A is routed through a first home link on Access #1, IP flow B is routed through a second home link on Access #2, and IP flow C is routed through a non-home link on Access #3. Regarding IP flow C, the UE is not on the home link, therefore, a CoA1 is assigned to the UE.

In such case, in fact, the UE using simultaneously a 3GPP access (where the connectivity is provided either with PMIPv6 or GTP) and a non 3GPP access and being connected over the non-3GPP access using PMIPv6 (i.e., S2a or S2b are used and they use PMIPv6) as described in FIGS. 8 and 9. In such case, the UE is on two home links from a point of view of DSMIPv6, and no DSMIPv6 tunneling shall be used. This specific scenario is not described in this invention. However an extended scenario where the UE is connected on two access that are home link for the UE and a third access that is not home link for the UE is described.

A final component of the problem is related to the scenario where the UE connects first on a link that is not home link (i.e. a non-3GPP access using DSMIPv6) and subsequently to a 3GPP access. In current specifications, when the UE connects to a 3GPP access, the UE performs an attach procedure. Two types of attach procedures are defined—an "initial attach" and a "handover".

"Initial attach": during the attach procedure, the UE provides an indication of Attach Type as "initial attach". This is used when the UE is actually connecting to the network for the first time and therefore it has no IP address allocated (i.e., no HoA) nor a PDN GW/HA is allocated to serve the UE. In such case, the network selects a new PDN GW and assigns a new HoA to the UE. "Handover": during the attach procedure, the UE provides an indication of Attach Type as "handover". This is used when the UE is actually already connected over another access and it is handing over the connection to the 3GPP access. In such case the UE has an IP address allocated (i.e., HoA) over the previous access and a PDN GW/HA is allocated to serve the UE. In such case, the network does not select a new PDN GW and does not assign a new HoA to the UE, but simply switch the connectivity from the old access to the new access.

FIG. 8 illustrates a procedure 800 including steps involved in an initial attach, which steps are further described in 3GPP TS 23.401 (which is incorporated herein by reference). Note that the procedure for initial attach over 3GPP is repeated also during handover from non-3GPP, as described in the steps, and shown in FIGS. 9 and 10.

Referring first to FIG. 8, note that for a PMIP-based S5/S8, procedure steps (A), (B), and (C) are defined in TS 23.402. Steps 7, 10, 14, 15 and 16 concern GTP based S5/S8. Also note that the steps in (D) are executed only upon handover from non-3GPP access. Additionally, only the key steps of FIG. 8 are described below. At step 1, the UE initiates the Attach procedure by the transmission, to the eNodeB, of an Attach Request (IMSI or old GUTI, . . . , Attach Type, . . . ) message. Attach Type indicates "Handover" when the UE has already an activated PDN GW/HA due to mobility with non-3GPP accesses. The eNodeB . . . forwards the Attach Request message to the new MME (step 2).

At step 13, if the PDN subscription context contains a dynamically allocated PDN GW identity and the Attach Type does not indicate "Handover", the MME may select a new PDN GW as described in clause PDN GW selection function, e.g., to allocate a PDN GW that allows for more efficient routing. If the PDN subscription profile contains no PDN GW address for the default PDN and the Attach Type indicates "Handover", the MME select a new PDN GW as described in clause PDN GW selection function. The new MME selects a Serving GW, then the new MME sends a Create Default Bearer Request ( . . . , PDN GW address, PDN Address, . . . , Handover Indication, . . . ) message to the selected Serving GW. Handover Indication is included if the Attach type indicates handover.

At step 14, the Serving GW sends a Create Default Bearer Request ( . . . , PDN Address, . . . , Handover Indication, . . . ) message to the PDN GW indicated by the PDN GW address received in the previous step. At step 15, if dynamic PCC is deployed, and the Handover Indication is not present, the PDN GW performs an IP-CAN Session Establishment procedure as defined in TS 23.203, and thereby obtains the default PCC rules for the UE. If dynamic PCC is deployed and the Handover Indication is present, the PDN GW executes a PCEF-Initiated IP-CAN Session Modification procedure with the PCRF as specified in TS 23.203 to obtain the rules required for the PDN GW in the VPLMN or HPLMN to function as the PCEF for all the active sessions the UE has established with the new IP-CAN type as a result of the handover procedure. If, however, dynamic PCC is not deployed, the PDN GW may apply local QoS policy.

At step 16, the PDN GW returns a Create Default Bearer Response ( . . . ) message to the Serving GW when the Handover Indication is present, the PDN GW does not yet send downlink packets to the SGW; the downlink path is to be switched at step 22*a*. At step 22, the new MME sends an Update Bearer Request ( . . . , Handover Indication) message to the Serving GW. At step 22*a*, if the Handover Indication is included in step 22, the Serving GW sends an Update Bearer Request (Handover Indication) message to the PDN GW to prompt the PDN GW to tunnel packets from non 3GPP IP access to 3GPP access system and immediately start routing packets to the Serving GW for the default and any dedicated EPS bearers established. At step 22*b*, the PDN GW acknowledges by sending Update Bearer Response to the Serving GW.

At step 23, the Serving GW acknowledges by sending Update Bearer Response (EPS Bearer Identity) message to the new MME. The Serving GW can then send its buffered downlink packets. At step 24, after the MME receives Update Bearer Response (EPS Bearer Identity) message, if Attach type does not indicate handover, and an EPS bearer was established and the subscription data indicates that the user is allowed to perform handover to non-3GPP accesses, and if the MME selected a PDN GW that is different from the PDN GW identity which was indicated by the HSS in the PDN subscription context, the MME shall send an Update Location Request including the APN and PDN GW identity to the HSS for mobility with non-3GPP accesses. Note that in the case of a handover from a non-3GPP access, the PDN GW initiates resource allocation deactivation procedure in the trusted/untrusted non-3GPP IP access.

Step 8 of FIG. 8 results also in storing in PCC the IP-CAN indication for the connection (i.e. 3GPP access). In case of UE connected first to an access that is not home link and then connecting to an access that is home link (i.e. a 3GPP access) and moving some flows from the non-3GPP access to the 3GPP access, neither indication works. In fact: "Initial attach": since in such case the network selects a new PDN GW and assign a new HoA to the UE, the UE ends up with a different HoA and cannot moves the flows over from the non-3GPP access. "Handover": in this case the network would typically switch the connectivity from the old access to the new access if the old access is connected using PMIP, since "Handover" is used to provide IP address preservation, and the UE would then delete the S2c BCE at the end of the handover. FIGS. 9 and 10 describe this type of handover as currently defined where all the flows are being moved to the new access.

Regarding the steps shown in FIG. 9, the UE uses a trusted or untrusted non-3GPP access system (step 1). For example, the UE can have a DSMIPv6 session with the PDN GW. In step 2, the UE discovers and attaches to the 3GPP access. In step 3, the UE sends a BU (lifetime) to the PDN GW to de-register its DSMIPv6 binding, as defined in draft-ietf-mip6-nemo-v4traversal (which is incorporated herein by reference) that was created while the UE was in non-3GPP access system. The PDN GW responds with a BA message as defined in draft-ietf-mip6-nemo-v4traversal. Step 3 corresponds to deleting the BCE for the connection with S2c over the old link.

Referring to FIG. 10, in step 1, the UE uses a trusted or untrusted non-3GPP access system and is served by a PDN GW (as PMIPv6 LMA or MIPv4 HA). In step 2, the UE discovers the E-UTRAN access and determines to transfer its current sessions (i.e., handover) from the currently used non-3GPP access system to E-UTRAN. In step 3, the UE sends an Attach Request to the MME with Attach Type indicating "Handover" Attach. In step 4, the MME contacts the HSS and authenticates the UE. The MME receives information on the PDNs the UE is connected to over the non-3GPP access in the Subscriber Data obtained from the HSS.

In step 5, after successful authentication, the MME performs location update procedure and subscriber data retrieval from the HSS. Since the Attach Type is "Handover" Attach, the PDN GW address conveyed to the MME will be stored in PDN subscription context. In step 6, for connectivity to multiple PDNs, even if the UE had disconnected from the Default PDN before the handover, the MME selects a serving GW as described in TS 23.401 and sends a Create Default Bearer Request ( . . . , PDN-GW address, Handover Indication) message to the selected Serving GW. Since the Attach Type is "Handover" Attach, a Handover Indication information is included. In step 7, the Serving GW sends a Create Default Bearer Request (Handover Indication) message to the PDN-GW in the VPLMN or HPLMN. Since the MME includes Handover Indication information in Create Default Bearer Request message, the Serving GW includes this information in Create Default Bearer Request message. Since Handover Indication is included, the PDN GW should not switch the tunnel from non-3GPP IP access to 3GPP access system at this point.

In step 8, since Handover Indication is included, the PDN GW executes a PCEF-Initiated IP CAN Session Modification Procedure with the PCRF as specified in TS 23.203 to obtain the rules required for the PDN GW in the VPLMN or HPLMN to function as the PCEF for all the active sessions the UE has established with the new IP-CAN type as a result of the handover procedure. In step 9, the PDN GW responds with a Create Default Bearer Response message to the Serving GW. In step 10, the Serving GW returns a Create Default Bearer Response message to the MME. In step 11, Radio and Access bearers are established at this step in the 3GPP access. In step 12, the MME sends an Update Bearer Request ( . . . , Handover Indication) message to the Serving GW.

In step 13, since the Handover Indication is included in step 12), the Serving GW sends an Update Bearer Request message to the PDN GW to prompt the PDN GW to tunnel packets from non 3GPP IP access to 3GPP access system and immediately start routing packets to the Serving GW for the default and any dedicated EPS bearers established. In step 14, the PDN GW acknowledges by sending Update Bearer Response to the Serving GW. In step 15, the Serving GW acknowledges by sending Update Bearer Response message to the MME. In step 16, the UE sends and receives data at this point via the E-UTRAN system. In step 18, the PDN GW shall initiate resource allocation deactivation procedure in the trusted/untrusted non-3GPP IP access.

Step 3 of FIG. 9 implies that the BCE corresponding to all the flows is deleted, and step 18 of FIG. 10 implies that all resources on non-3GPP are released. However, in theory one could think of using the "handover" indication for the specific case where the "handover" indication is provided. In fact the UE may not delete the BCE and instead modify the BCE to setup some filters to forward some flows on the 3GPP access and some on the non-3GPP access. However, step 8 of FIG. 10 results also in updating PCC with the IP-CAN indication for the connection (before the handover it identifies the non-3GPP access and is now modified to 3GPP access), even if some flows are maintained over the non-3GPP access. This may result in incorrect charging, deletion of flows based on policies, and other unwanted behaviors.

SUMMARY

In general, in one aspect, this specification describes a mechanism for a mobile node (connected to a packet data network over a first access network and a second access network) to enable the network to route packets to the UE over the correct access network and to enable the UE to perform handoff of IP flows from one access network to the other. The first access network can be a home link for the mobile node and the second access network can be a foreign link.

BRIEF DESCRIPTION OF THE DRAWINGS

FIG. 3 illustrates an example binding cache in a home agent (HA)/packet data network gateway (PGW) when multiple CoAs are registered for the same HoA with different binding descriptors.

FIG. 4 illustrates a scenario of simultaneous connectivity through multiple heterogeneous accesses.

FIG. 5 illustrates a scenario of simultaneous connectivity through multiple heterogeneous accesses.

FIG. 11 illustrates a new flag in a reserved field of a Binding Update message.

FIG. 12 illustrates a scenario in which the UE connects to a foreign link first, and then connects to a home link.

FIG. 13 illustrates a scenario in which the UE first connects to a home link, and then connects to a foreign link.

DETAILED DESCRIPTION

Figure 1:
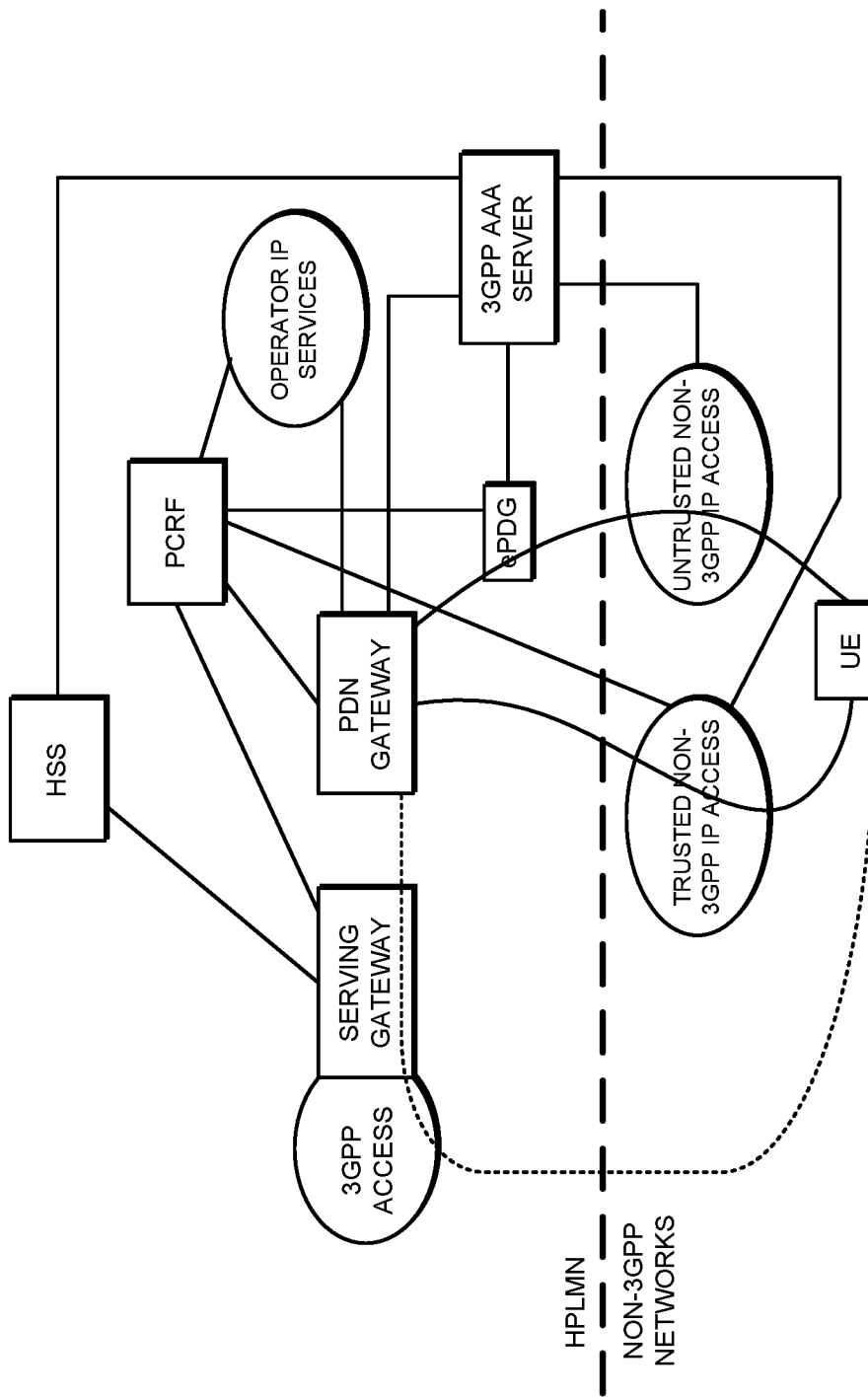
FIG. 1 illustrates a 3GPP architecture for multiple access in a non-roaming scenario.
Figure 2:
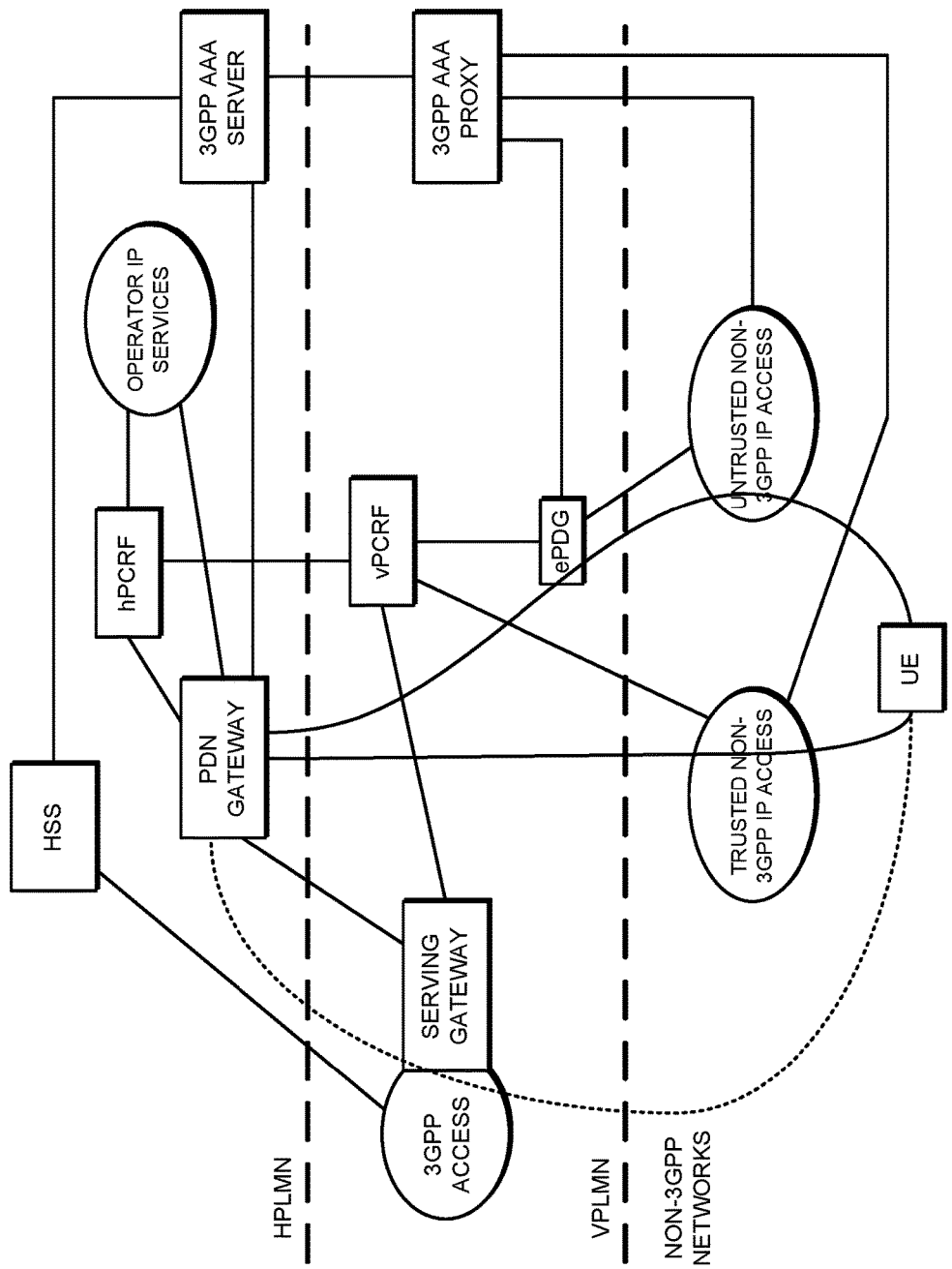
FIG. 2 illustrates a 3GPP architecture for multiple access in a roaming scenario.
Figure 6:
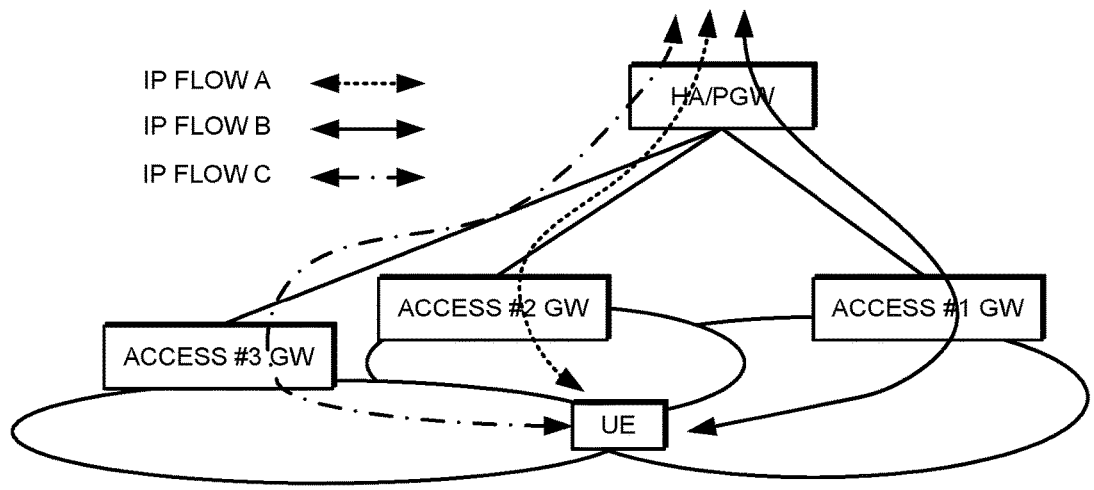
FIG. 6 illustrates a scenario in which a UE is connected via two home links.
Figure 7A:
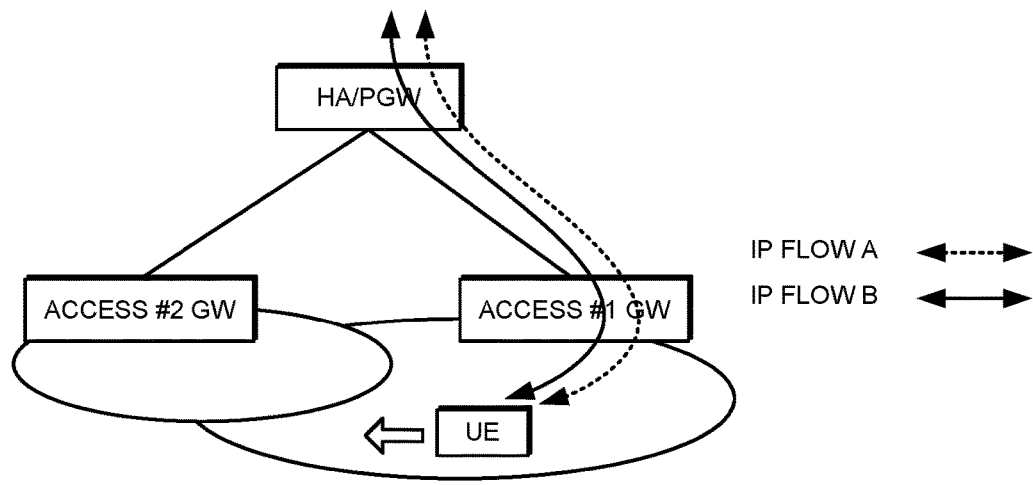
FIGS. 7A-7E illustrate various scenarios of simultaneous connectivity through multiple heterogeneous accesses.
Figure 7B:
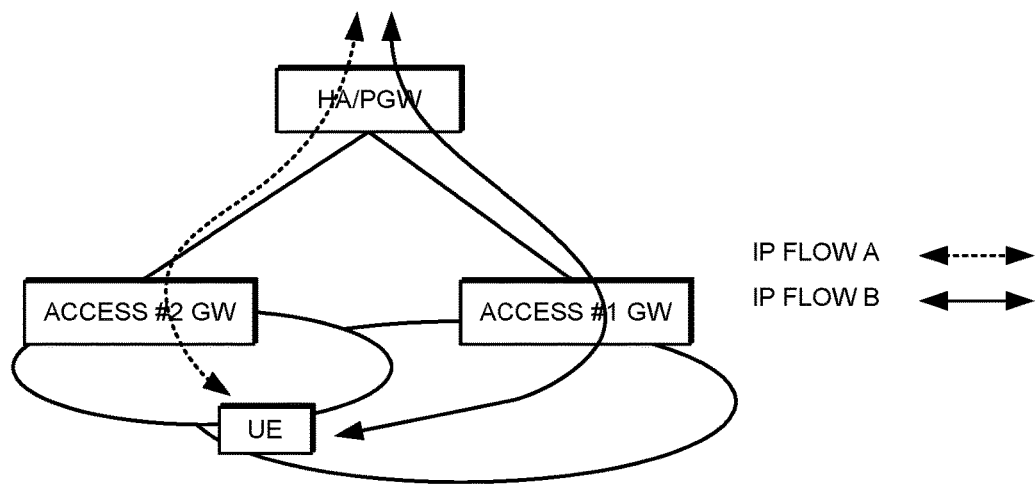
Figure 7C:
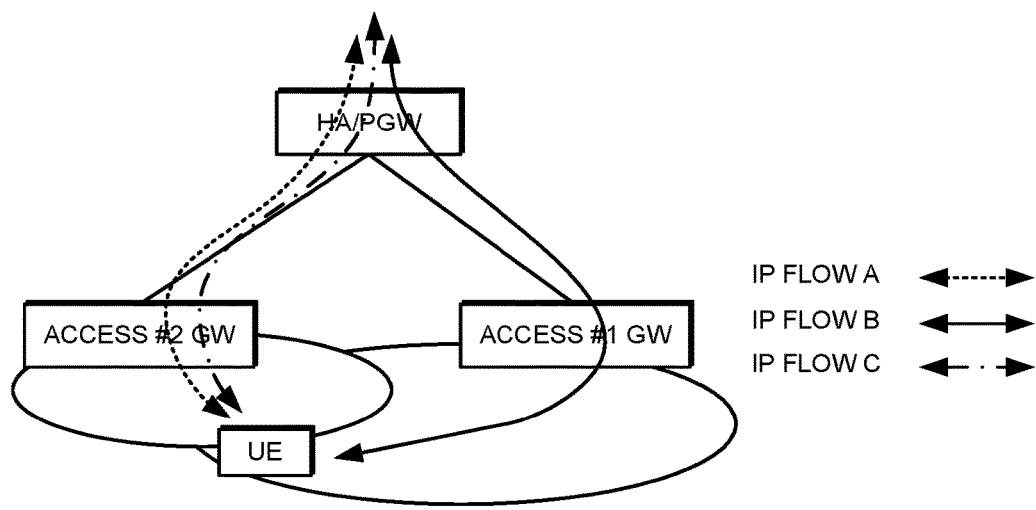
Figure 7D:
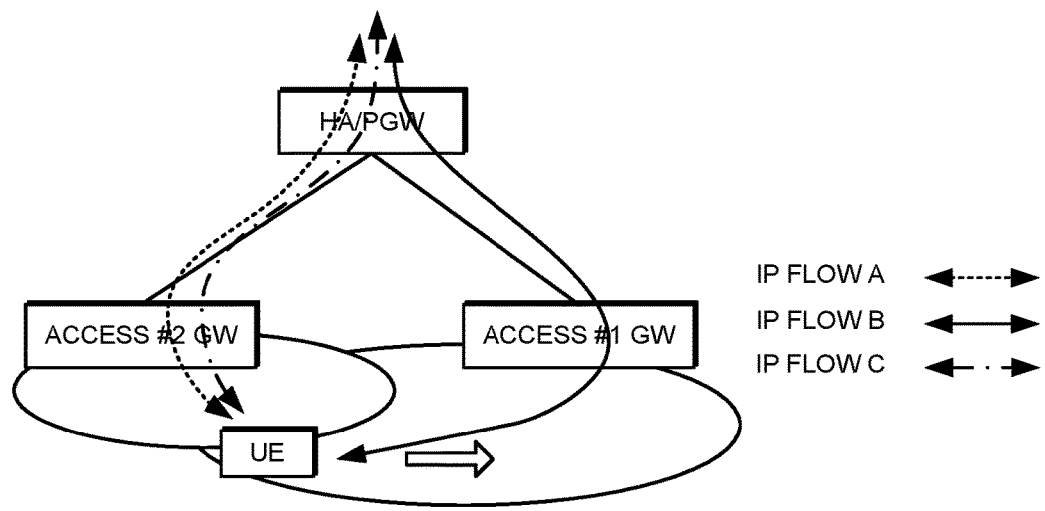
Figure 7E:
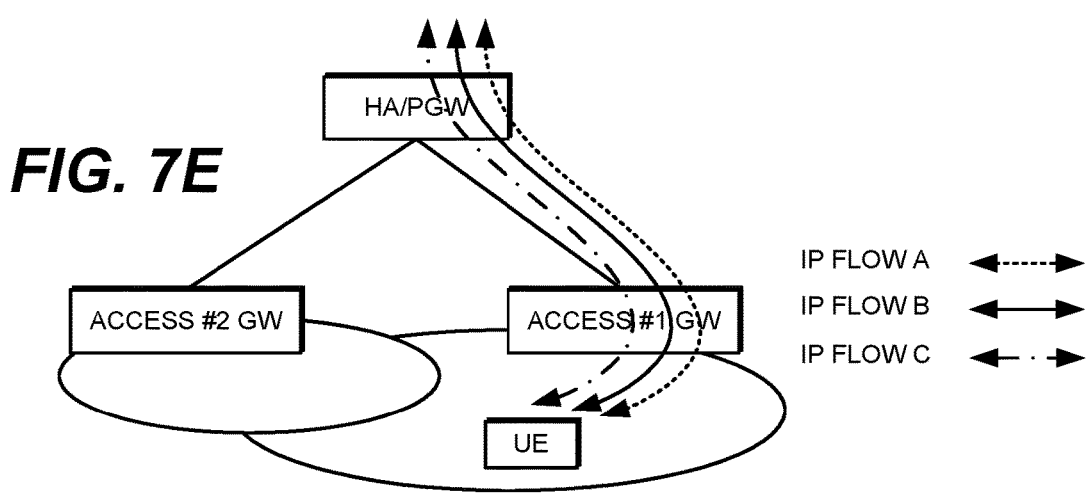

As discussed above, Current 3GPP specifications do not specify how a UE can simultaneously access a network through multiple heterogeneous accesses. For example, FIGS. 7A-7E illustrate various scenarios of simultaneous connectivity through multiple heterogeneous accesses. Simultaneous connectivity through multiple heterogeneous accesses is useful since multi-radio UEs start to become more common (e.g., 3GPP+WLAN in the home environment) and the UEs may have a form factors different than "phone". As a result, a UE may be anyway connected through different accesses to the same PDN. In such scenarios it is possible to use the UE's ability to connect via multiple accesses in parallel in order, e.g., to increase the overall bandwidth experienced by the UE to a given PDN. In such scenarios IP flows could be dynamically switched between cellular and other accesses where, e.g. "less valuable" high volume traffic could be dynamically "offloaded" to unlicensed accesses. IP flows would still switched between different accesses due to an actual handover, e.g., when one access is no longer available. In FIG. 7A, the UE initially has connectivity through Access #1, and both IP flows A and B are routed through Access #1. In FIG. 7B, the UE detects another access (Access #2), and IP flow A is routed through Access #2. In FIG. 7C, the UE adds an additional IP flow (IP flow C) over Access #2. In FIG. 7D, the UE moves towards an area of coverage in which only Access #1 is available. As shown in FIG. 7E, all the IP flows A, B, C are moved to Access #1. Various scenarios are described in detail below.

Scenario 1: UE Connected to One Home Link and One Foreign Link

The following three embodiments are defined in this invention for the scenario in which the UE connects to one home link and one foreign link simultaneously:

HA/PGW Binding Cache Establishment Through Home Link

In one embodiment, the UE sends mobility signaling messages over the home link in order to create a Binding Cache entry containing flow filters for the home link in the Home Agent. Such mobility signalling messages sent over the home link could be either a Binding Update message with an indication, e.g., a new flag or a new option or a special value in an existing field, or a Generic Notification message or a new type of mobility header message. In this embodiment, we focus the use of the Binding Update message for this purpose.

As specified in the Mobile IP specification, such as RFC 3775 (which in incorporated herein by reference), the Binding Update message can be sent over the home link only to remove the Binding Cache entry; otherwise, the Binding Update message may result in conflicts, for example both the Home Agent and the mobile node need to defend the same home address. Therefore, to enable simultaneous connectivity over multiple access networks, the Home Agent needs to behave differently from specified in RFC 3775 when receiving a Binding Update message over the home link. The Home Agent reacts based on the indication carried in the Binding Update message and its policy and configuration.

When sending the Binding Update message over the home link to create a Binding Cache entry, the UE must use its home address as the source IP address of the Binding Update message. The indication to the Home Agent can be the lifetime field set as a non-zero value and/or a new flag in the reserved field of the Binding Update message as shown in FIG. 11 and/or a BID mobility option (as described in IETF draft draft-ietf-monami6-multiplecoa-08) and a Flow Identification option (as described in IETF draft draft-ietf-mext-flow-binding-00). FIG. 11 illustrates Flow Binding on the home link (F)—i.e., a new (F) flag in the Binding Update message. The new flag (F) that indicates that the Binding Update is sent over the home link and is used for creating a Binding Cache entry for flow binding over the home link.

Once the Home Agent receives such Binding Update message from the UE, after verification, the Home Agent will create an additional Binding Cache entry for the same home address with the requested flow information. In the following we describe the procedures in details in two cases: 1) the UE connects to a foreign link first, and then connects to a home link; 2) the UE connects to a home link first, and then connects to a foreign link.

FIG. 12 illustrates the first case in which the UE first connects to a foreign link, and then connects to a home link. As indicated by (1), the UE first configures an address from a local access network. The UE detects the address and connects to a foreign link by running a home link detection mechanism, for example, by running the IKEv2 with the Home Agent during bootstrapping. The UE sends a Binding Update message over the foreign link to set up a Binding Cache entry in the Home Agent. The UE may specify the flow that the UE wants to direct to the foreign link in the Binding Update message. The Home Agent replies to the UE with a Binding Acknowledgement message to indicate the status of binding registration.

As indicated by (2), the UE then discovers and obtains an IP address from another access network. By performing a home link detection mechanism, the UE connects to the home link. In the example of FIG. 12, the UE plans to keep network connectivity over both the foreign link and the home link, therefore, the UE sends a Binding Update message over the home link with such indication to the Home Agent to request certain flow to be directed to the home link. After the Home Agent processes such Binding Update message, the Home Agent creates another Binding Cache entry for the UE. In such Binding Cache entry, the care-of address field may be set as either the home address or a different special or dummy value to indicate that the flow associated with this entry is forwarded to the UE via a home link. The Home Agent replies to the UE with a Binding Acknowledgement message to indicate the status of binding registration. With this approach, the UE can modify the flows in the Binding Cache entry by sending a Binding Update message over any link.

FIG. 13 illustrates the second case in which the UE first connects to a home link, and then connects to a foreign link. First, the UE configures an address from a local access network. The UE detects the address and connects to a home link by running a home link detection mechanism, for example, by running the IKEv2 with the Home Agent during bootstrapping. The UE may or may not send a Binding Update message over the home link to set up a Binding Cache entry in the Home Agent at this time. The UE then discovers and obtains an IP address from another access network. By performing a home link detection mechanism, the UE connects to the foreign link. The UE may specify the flow that the UE wants to direct to the foreign link in the Binding Update message. The Home Agent replies to the UE with a Binding Acknowledgement message to indicate the status of binding registration.

The UE wants to keep network connectivity over both the foreign link and the home link. If the UE has not sent a Binding Update message over the home link upon attachment, the UE then sends a Binding Update message over the home link with such indication to the Home Agent to request certain flow to be directed to the home link. If the UE has already sent a Binding Update message over the home link upon attachment, the UE may send another Binding Update message over the home link to modify the Binding Cache entry for the home link.

After the Home Agent processes such Binding Update message, the Home Agent creates or modifies the Binding Cache entry for the UE. In such Binding Cache entry, the care-of address field may be set as either the home address or a different special or dummy value to indicate that the flow associated with this entry is forwarded to the UE via a home link. The Home Agent replies to the UE with a Binding Acknowledgement message to indicate the status of binding registration. With this approach, the UE can modify the flows in the Binding Cache entry by sending a Binding Update message over any link.

An example description of how the handover actually takes place and how PCC interaction takes will now be provided. UE has flows 1 and 2 on non-3GPP with S2c. UE decides to move flow 1 to 3GPP. UE performs an handover from non-3GPP to 3GPP using S2c (based on FIGS. 9 and 10, but with the modifications described here and shown procedure 1400 of FIG. 14) and the UE provides indication of Attach Type="additional attach" (or a value with similar meaning). The original step 14 of FIG. 8 and step 7 of FIG. 10 now carries the Handover Indication="additional attach" (or a value with similar meaning) to PDN GW and PDN GW does not perform the original step 15 of FIG. 8 and step 8 of FIG. 10 when Handover Indication="additional attach" (or a value with similar meaning). Now the UE is attached on 3GPP but the data is still flowing over non-3GPP.

The UE, once attach is done, sends BU (on either access) to modify the flow binding and create the BCE flow binding for the flows to be sent over the 3GPP access (i.e., directly routed to the HoA). In reaction, the PDN GW performs the original step 15 of FIG. 8 and step 8 of FIG. 10 to modify the information in the PCC. The PDN GW may receive confirmation of the modification and that the flows moved to the 3GPP access are allowed, or may get an error message that indicates the UE is not allowed to move the flows. The UE in such case: (1) needs to know that it has to disconnect from the 3GPP access: the UE does so when receiving a BA with a rejection code (e.g., the "128 Flow binding rejected, reason unspecified" error code defined in the flow binding solution, or using a new "not allowed" rejection), and (2) always requests for a BA (Binding Update DSMIPv6 message). BA is sent only when the UE requests the BA, and the UE does not exchanged traffic over the link until the BA is received. The UE is configured to request the BA. For UEs where the DSMIPv6 may reside in, e.g., a laptop and not the UE itself, there may be some unexpected behaviors since it is not possible to force the UE to request a BA.

Alternatively, in 3GPP the PDN GW always sends a BA upon receiving a BU modifying flow bindings, to ensure the UE receives the authorization for the modifications. That would work both for pure 3GPP UEs and, e.g., laptops connected to a 3GPP UE.

Figure 14:
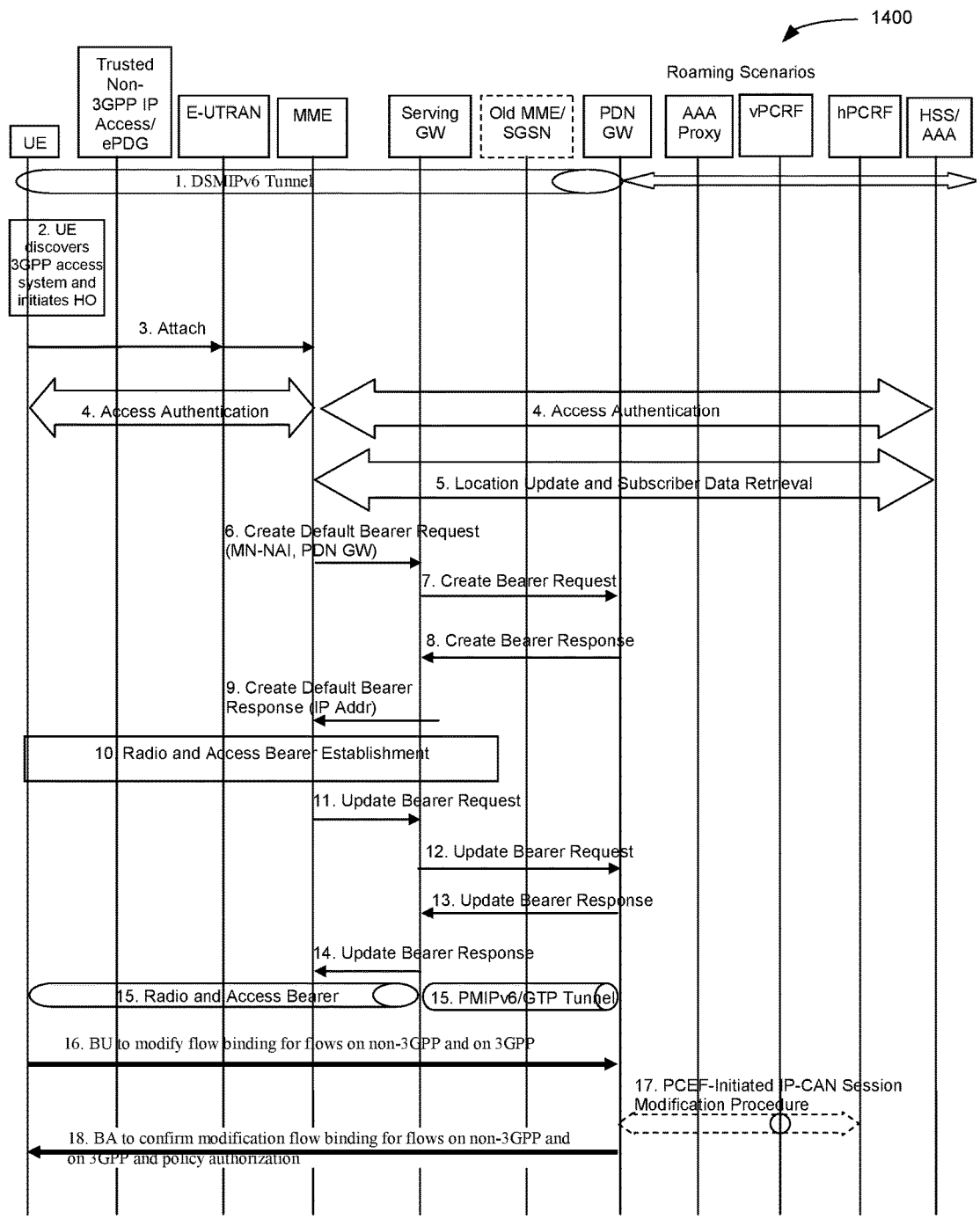
FIG. 14 illustrates a handover procedure in accordance with one implementation.

FIG. 14 illustrates a modified handover procedure with a modified attach indication and PCC interactions. In step 1, the UE uses a trusted or untrusted non-3GPP access system. In one example, the UE has a DSMIPv6 session with the PDN GW. In step 2, the UE discovers and attaches to the 3GPP access. In step 3, the UE sends an Attach Request to the MME with Attach Type indicating "Additional Attach". In step 4, the MME contacts the HSS and authenticates the UE. The MME receives information on the PDNs the UE is connected to over the non-3GPP access in the Subscriber Data obtained from the HSS. In step 5, after successful authentication, the MME performs location update procedure and subscriber data retrieval from the HSS. Since the Attach Type is "Additional Attach", the PDN GW address conveyed to the MME will be stored in PDN subscription context.

In step 6, for connectivity to multiple PDNs, even if the UE had disconnected from the Default PDN before the handover, the MME selects a serving GW as described in TS 23.401 and sends a Create Default Bearer Request ( . . . , PDN-GW address, Handover Indication) message to the selected Serving GW. Since the Attach Type is "Additional Attach" Attach, a Handover Indication="Additional Attach" (or an Additional Attach Indication) information is included. In step 7, the Serving GW sends a Create Default Bearer Request (Handover Indication="Additional Attach" or an Additional Attach Indication) message to the PDN-GW in the VPLMN or HPLMN. Since the MME includes Handover Indication information in Create Default Bearer Request message, the Serving GW includes this information in Create Default Bearer Request message. Since Handover Indication="Additional Attach" (or an Additional Attach Indication) is included, the PDN GW should not switch the tunnel from non-3GPP IP access to 3GPP access system at this point.

In step 8, the PDN GW responds with a Create Default Bearer Response message to the Serving GW. In step 9, the Serving GW returns a Create Default Bearer Response message to the MME. In step 10, Radio and Access bearers are established at this step in the 3GPP access. In step 11, the MME sends an Update Bearer Request ( . . . , Handover Indication="Additional Attach" or an Additional Attach Indication) message to the Serving GW. In step 12, since the Handover Indication Handover Indication="Additional Attach" (or an Additional Attach Indication) is included in step 12), the Serving GW sends an Update Bearer Request message to the PDN GW to prompt the PDN GW to tunnel packets from non 3GPP IP access to 3GPP access system and immediately start routing packets to the Serving GW for the default and any dedicated EPS bearers established.

In step 13, the PDN GW acknowledges by sending Update Bearer Response to the Serving GW. In step 14, the Serving GW acknowledges by sending Update Bearer Response message to the MME. In step 15, the UE is connected over E-UTRAN but does not yet send and receive data at this point via the E-UTRAN system. In step 16, the UE sends a BU (on the non-3GPP link in this scenario, and on the home link in the scenario described later on in the document) to modify the flow binding and create the BCE flow binding for the flows to be sent over the 3GPP access (i.e., directly routed to the HoA). In one implementation, a 3GPP UE always requests for a BA (Binding Update DSMIPv6 message), and the UE does not exchanged traffic over the new link until the BA is received. The UE is configured to request the BA. For UEs where the DSMIPv6 may reside in, e.g., a laptop and not the UE itself, there may be some unexpected behaviors since it is not possible to force the UE to request a BA.

In step 17, the PDN GW executes a PCEF-Initiated IP CAN Session Modification Procedure with the PCRF to obtain the rules required for the PDN GW in the VPLMN or HPLMN to function as the PCEF for all the active sessions the UE has established with the new IP-CAN type as a result of the handover procedure. The PDN GW also indicates which IP Flows are using IP-CAN=3GPP and which are using IP-CAN=non-3GPP. The PDN GW may receive confirmation of the modification and that the flows moved to the 3GPP access are allowed, or may get an error message that indicates the UE is not allowed to move the flows.

In step 18, The PDN GW returns a BA message to the UE. The UE in such case needs to know that it has to disconnect from the 3GPP access. The UE does so when receiving from the PDN GW a BA with a rejection code (e.g., the "128 Flow binding rejected, reason unspecified" error code defined in the flow binding solution, or using a new "not allowed" rejection). If instead the UE is allowed to route the flows over the new access, the BA does not contain an error code. The PDN GW may return the BA only when the UE requests it in the BU, or alternatively the PDN GW always sends a BA upon receiving a BU modifying flow bindings, to ensure the UE receives the authorization for the modifications. That would work both for pure 3GPP UEs and, e.g., laptops connected to a 3GPP UE.

HA/PGW Binding Cache Establishment Through Non-Home Link

In one embodiment, information of flows directed to the home link is carried either in the Binding Update message sent over the foreign link or in the Binding Update message for de-registration sent over the home link. In such Binding Update messages, the UE includes the Flow Identification option and the Binding Identifier Mobility Option for the home link, and optionally together with those options for the foreign link. Described below are procedures for the following three cases: 1) the UE first connects to a foreign link, and then connects to a home link (FIG. 15); 2) the UE first connects to a home link, and then connects to a foreign link (FIG. 16); 3) the UE connects to both home link and foreign link, and then the UE drops the connection over the foreign link (FIG. 17).

Figure 15:
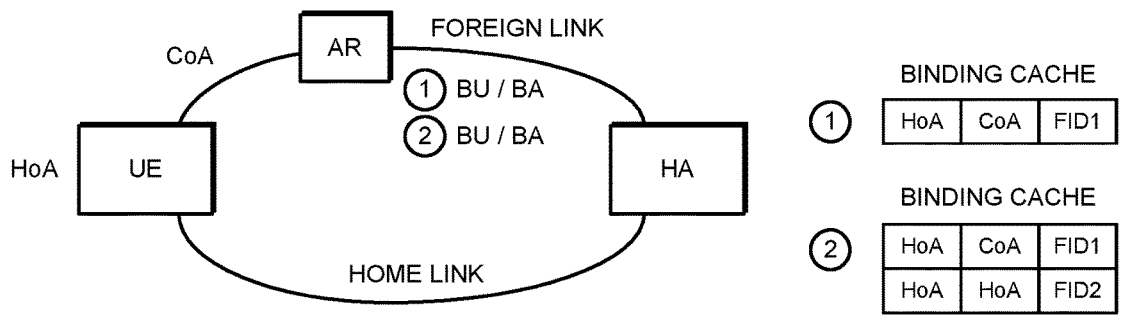
FIG. 15 illustrates a scenario in which a UE first connects to a foreign link, and then connects to a home link.

Referring first to the case illustrated in FIG. 15, The UE configures an address from a local access network. the UE detects that the UE is connected to a foreign link by running a home link detection mechanism, for example, by running the IKEv2 with the Home Agent during bootstrapping. The UE sends a Binding Update message over the foreign link to set up a Binding Cache entry in the Home Agent. The UE may specify the flow that the UE wants to direct to the foreign link in the Binding Update message. The Home Agent replies to the UE with a Binding Acknowledgement message to indicate the status of binding registration.

The UE then discovers and obtains an IP address from another access network. By performing a home link detection mechanism, the UE realizes that the UE is connected to the home link. The UE wants to keep network connectivity over both the foreign link and the home link, and the UE sends a Binding Update message over the foreign link with some indication to the Home Agent to request certain flow to be directed to the home link. Optionally, the UE can modify the flows to be directed to the foreign link in the same Binding Update message by including the Binding Identifier Mobility Option and Flow Identification Mobility Option for the foreign link. After the Home Agent processes such Binding Update message, the Home Agent creates another Binding Cache entry for the UE. In such Binding Cache entry, the care-of address field may be set as either the home address or a different special or dummy value to indicate that the flow associated with this entry is forwarded to the UE via a home link. The Home Agent replies to the UE with a Binding Acknowledgement message to indicate the status of binding registration.

Figure 16:
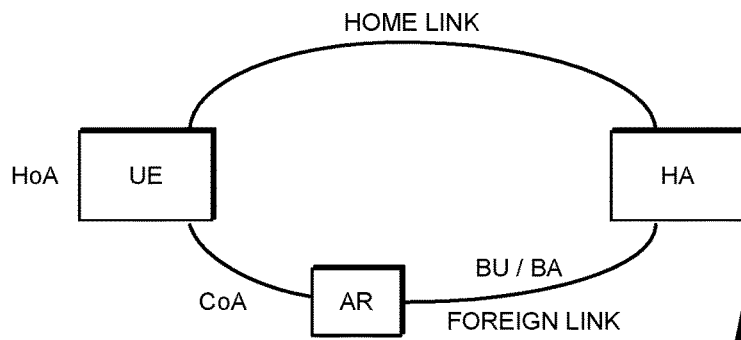
FIG. 16 illustrates a scenario in which a UE first connects to a home link, and then connects to a foreign link.
Figure 17:
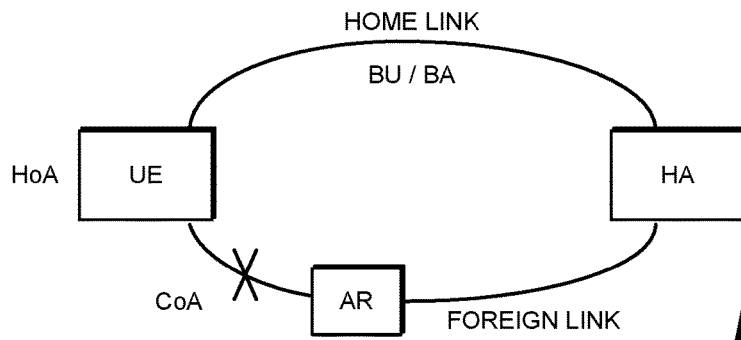
FIG. 17 illustrates a scenario in which a UE connects to both home link and foreign link, and then the UE drops the connection over the foreign link.

Referring to the case illustrated in FIG. 16, the UE first configures an address from a local access network. The UE detects that the UE is connected to a home link by running a home link detection mechanism, for example, by running the IKEv2 with the Home Agent during bootstrapping. The UE does not send a Binding Update message over the home link to set up a Binding Cache entry in the Home Agent at this time.

The UE then discovers and obtains an IP address from another access network. By performing a home link detection mechanism, the UE realizes that the UE is connected to the foreign link. If the UE wants to keep network connectivity over both the foreign link and the home link, the UE specifies the flows that the UE wants to direct to the foreign link and the home link in the Binding Update message by using multiple Flow Identification options and Binding Identifier options for the home link and the foreign link. After the Home Agent processes such Binding Update message, the Home Agent creates the Binding Cache entries for the UE. In such Binding Cache entry for the home link, the care-of address field may be set as either the home address or a different special or dummy value to indicate that the flow associated with this entry is forwarded to the UE via a home link. The Home Agent replies to the UE with a Binding Acknowledgement message to indicate the status of binding registration.

Referring to the case illustrated in FIG. 17, the UE already sets up flow binding for both the home link and the foreign link. When the UE wants to disconnect the connection over the foreign link, the UE sends a Binding Update message over the home link with the lifetime as zero for the Binding Cache entry created for the foreign link. Such Binding Update message includes the Flow Identification option and Binding Identifier option to modify the Binding Cache entry for the home link, for example, to direct the traffic forwarded over the foreign link before to the home link instead. The description of how the handover actually takes place and how PCC interaction takes place can be the same as in conventional techniques, however, with the BU being sent over a different link.

Routing Configuration Based on Security Establishment

A third approach is to use the IKE informational exchange over the home link to provide flow binding information for the home link. To do this, the IKE needs to be extended to carry flow information, for example by defining a new type of Configuration Attributes, or a new type of Notify payload, or a different type of payload. Note that such IKE informational exchange is independent from the BU/BA message exchange over the foreign link. The UE can start the IKEv2 Informational exchange any time when there is an IKEv2 SA available between the UE and the HA. When the Home Agent receives such IKE information exchange messages, the Home Agent stores such information and uses such information for traffic forwarding. For example, when the Home Agent receives a packet destined at the home address of the UE, the Home Agent may look up the Binding Cache entry first, if no entry matches, the Home Agent turns to the stored information to decide how to forward the packet.

Figure 18:
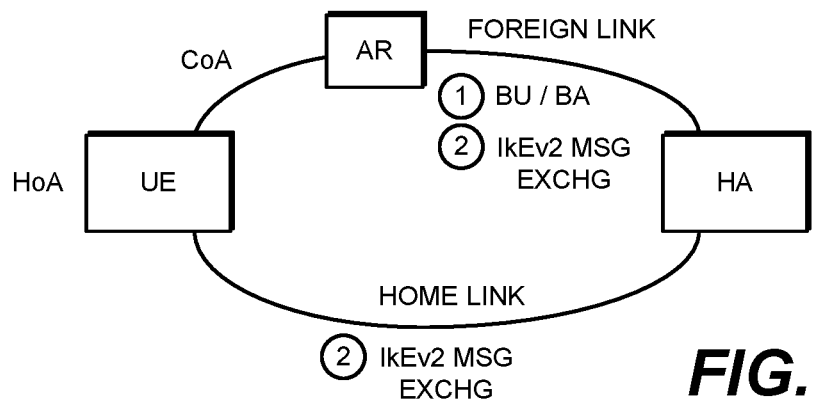
FIG. 18 illustrates a scenario in which a UE first connects to a foreign link, and then connects to a home link.
Figure 19:
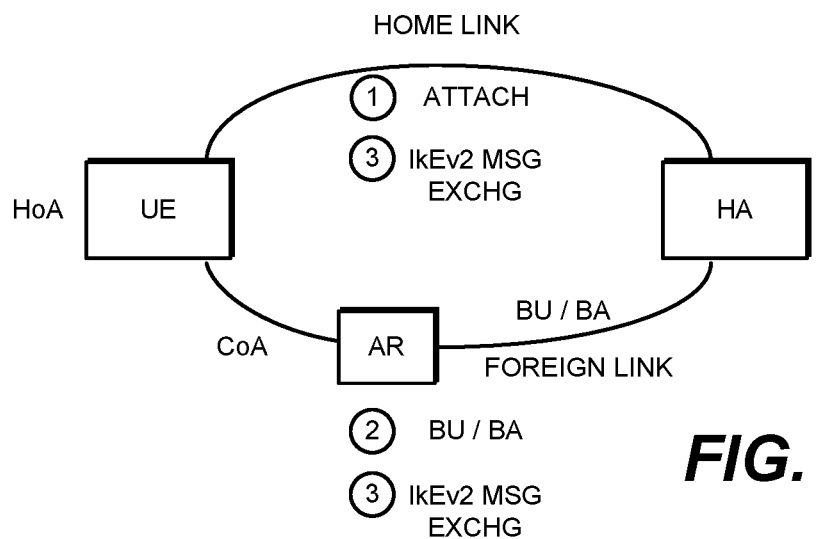
FIG. 19 illustrates a scenario in which a UE first connects to a home link, and then connects to a foreign link.

There are two cases: 1) the UE first connects to a foreign link, and then connects to a home link (FIG. 18); and 2) the UE first connects to a home link, and then connects to a foreign link (FIG. 19).

Referring to the case illustrated in FIG. 18, the UE first configures an address from a local access network. The UE detects the UE connects to a foreign link by running a home link detection mechanism, for example, by running the IKEv2 with the Home Agent during bootstrapping. The UE sends a Binding Update message over the foreign link to set up a Binding Cache entry in the Home Agent. The UE may specify the flow that the UE wants to direct to the foreign link in the Binding Update message. The Home Agent replies to the UE with a Binding Acknowledgement message to indicate the status of binding registration.

The UE then discovers and obtains an IP address from another access network. By performing a home link detection mechanism, the UE realizes the UE is connected to the home link. The UE wants to keep network connectivity over both the foreign link and the home link, the UE then starts an IKEv2 informational exchange with the Home Agent over either the home link or the foreign link carrying the indication to request certain flow to be directed to the home link. In addition, the UE may send the Binding Update message over the foreign link to update the flow binding for the foreign link.

Referring to the case illustrated in FIG. 19, the UE first configures an address from a local access network. The UE detects that the UE is connected to a home link by running a home link detection mechanism, for example, by running the IKEv2 with the Home Agent during bootstrapping. The UE may or may not perform the IKEv2 informational exchange over the home link with the Home Agent at this time. The UE then discovers and obtains an IP address from another access network. By performing a home link detection mechanism, the UE realizes that the UE is connected to the foreign link. The UE may specify the flow that the UE wants to direct to the foreign link in the Binding Update message. The Home Agent replies to the UE with a Binding Acknowledgement message to indicate the status of binding registration. The UE wants to keep network connectivity over both the foreign link and the home link. The UE then starts the IKEv2 informational exchange with the Home Agent over either the home link or the foreign link carrying the indication to request certain flow to be directed to the home link.

Figure 20:
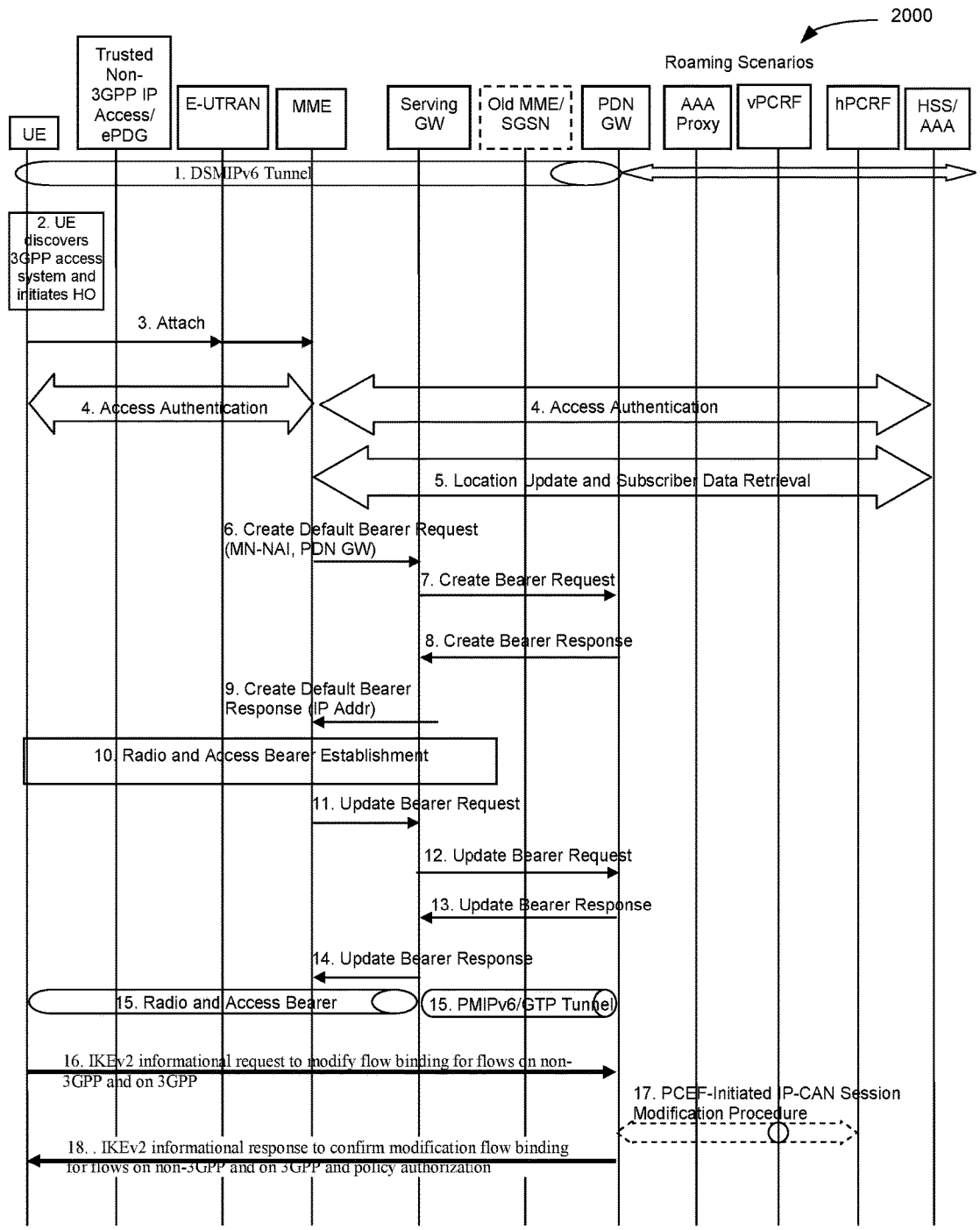
FIG. 20 illustrates a handover procedure in accordance with one implementation.

FIG. 20 illustrates a modified handover procedure 2000 in accordance with one implementation. The handover procedure 2000 includes a modified attach indication and PCC interactions when the IKEv2 informational exchange is used to update flow binding information. The steps involved in FIG. 20 are discussed below.

Steps 1 to 15 are the same as described with respect to FIG. 14. In step 16, the UE starts the IKEv2 informational exchange with the PDN GW by sending an IKEv2 informational request message (on the non-3GPP link or on the home link) to modify the flow binding and create the BCE flow binding for the flows to be sent over the 3GPP access (i.e., directly routed to the HoA). In one implementation, the UE does not exchange traffic over the new link until the IKEv2 information reply message is received. In step 17, the PDN GW executes a PCEF-Initiated IP CAN Session Modification Procedure with the PCRF to obtain the rules required for the PDN GW in the VPLMN or HPLMN to function as the PCEF for all the active sessions the UE has established with the new IP-CAN type as a result of the handover procedure. The PDN GW also indicates which IP Flows are using IP-CAN=3GPP and which are using IP-CAN=non-3GPP. The PDN GW may receive confirmation of the modification and that the flows moved to the 3GPP access are allowed, or may get an error message that indicates the UE is not allowed to move the flows.

In step 18, the PDN GW returns an IKEv2 informational reply message to the UE. The UE in such case needs to know that the UE has to disconnect from the 3GPP access. The UE does so when receiving from the PDN GW a reply message with a rejection code (e.g., a new "not allowed or failed" rejection code). Otherwise, the UE is allowed to route the flows over the new access, and the IKEv2 reply message does not contain an error code.

Scenario 2: UE Connected to Two Home Links and a Third Non-Home Link

The UE may obtain network connectivity to the same Home Agent via three different access networks, where two access networks are home links and one access network is the foreign link. For example the UE connects to two links using PMIP or using PMIP on one link and using GTP on the other link. When PMIP is used, the Home Agent that performs the function of the Local Mobility Anchor (LMA) maintains a Binding Cache entry where the IP address of the Mobile Access Gateway (MAG) is in the care-of address field. In addition, the Home Agent can distinguish the Binding Cache entry for PMIP from that for DSMIPv6 by associating a flag with the Binding Cache entry as defined in IETF draft-ietf-netlmm-proxymip6-18 (which is incorporated herein by reference).

HA/PGW Binding Cache Establishment Through Home Link

In one implementation, for scenario 2, the UE sends mobility signalling messages over the home link in order to create a Binding Cache entry containing flow filters for the home link in the Home Agent. Such mobility signalling messages could be either a Binding Update message with an indication, e.g., a new flag or a new option or a special value in an existing field, or a Generic Notification message or a new type of mobility header message. In one implementation, the Binding Update message is used for this purpose. However, in this case, there are two home links, and the Home Agent needs to determine the intended home link for the received mobility signalling message. To identify the home link in the Binding Update messages sent by the UE to the HA, some indication in addition to what is described in 3GPP TS 23.402 is needed. Such indication can be access technology type, the link-layer identifier of the UE's connected interface on the access link or other information.

Figure 10:
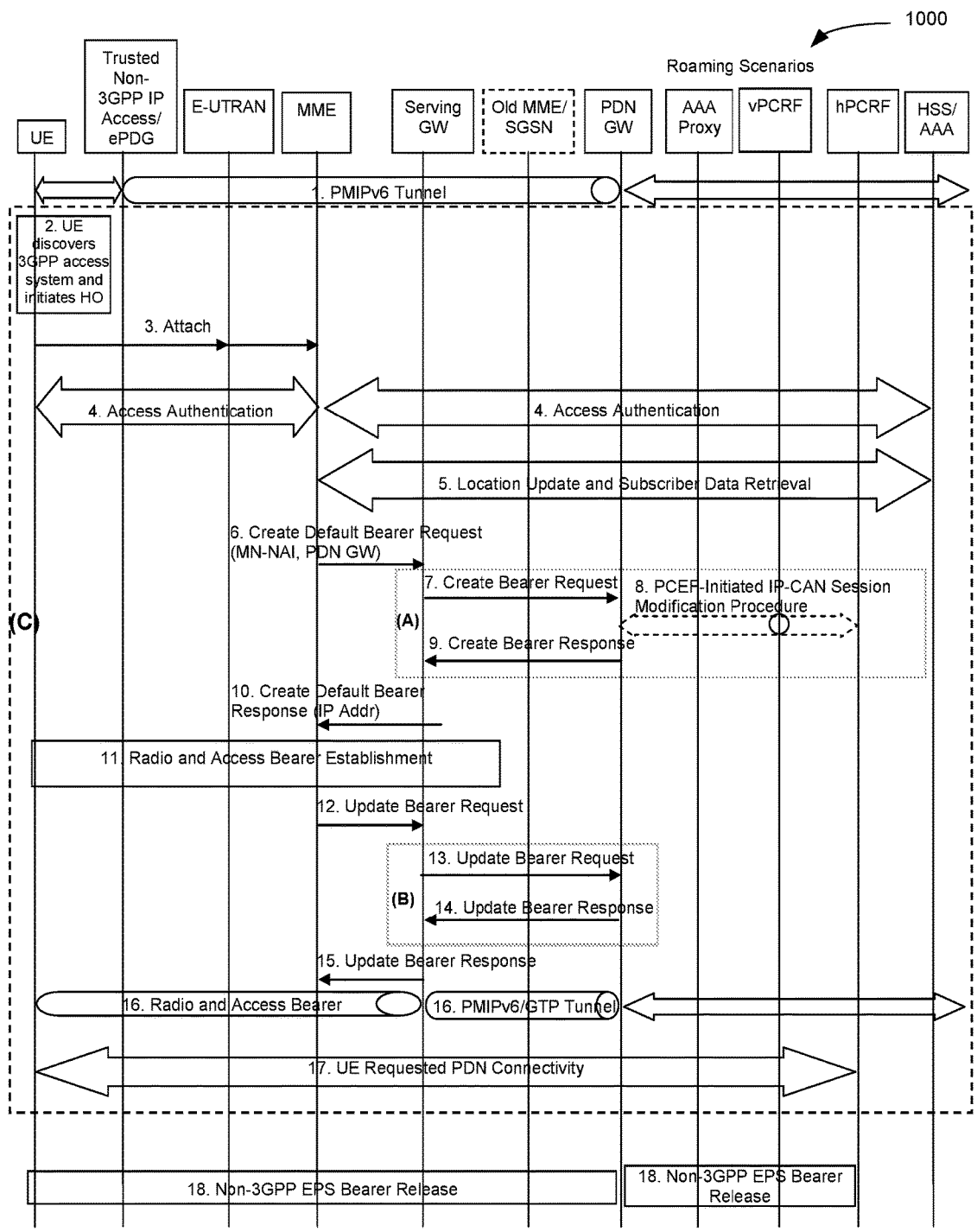
FIG. 10 illustrates a handover procedure in accordance with one implementation.

Furthermore, to enable simultaneous connectivity over multiple access networks, the Home Agent needs to behave differently from specified in RFC 3775 when receiving a Binding Update message over the home link. The Home Agent reacts based on the indication carried in the Binding Update message and its policy and configuration. When sending the Binding Update message over the home link to create a Binding Cache entry, (in one implementation) the UE uses an assigned home address as the source IP address of the Binding Update message. The indication to the Home Agent includes the lifetime field set as a non-zero value and/or a new flag in the reserved field of the Binding Update message as shown in FIG. 10 and/or a BID mobility option and a Flow Identification option and the Mobile Node Link-layer Identifier Option as defined in IETF draft-ietf-netlmm-proxymip6-18 (or IETF draft draft-haley-mext-generic-notification-message-00—which is incorporated herein by reference) and/or the Access Technology Type Option as defined in IETF draft-ietf-netlmm-proxymip6-18 (or IETF draft draft-haley-mext-generic-notification-message-00) to distinguish different home links.

Once the Home Agent receives such Binding Update message from the UE, after verification, the Home Agent creates an additional Binding Cache entry for the same home address with the requested flow information. Such Binding Cache entry also contains the Access Technology Type option and/or the Mobile Node Link-layer Identifier Option. The procedures for the following two cases are described herein: 1) the UE connects to a foreign link first, and then connects to home links (FIG. 21); 2) the UE connects to home links first, and then connects to a foreign link.

Figure 21:
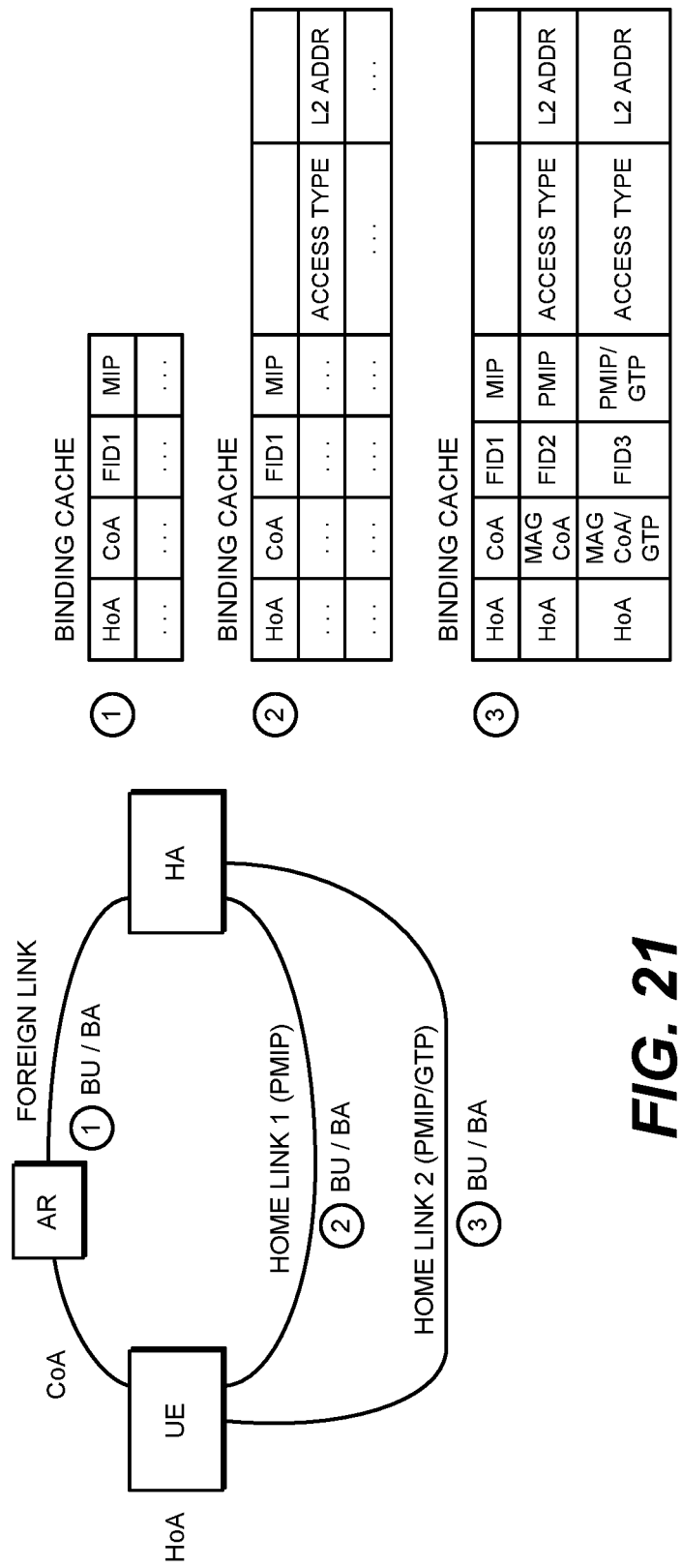
FIG. 21 illustrates a procedure when a UE connects first to a foreign link and then connects to a plurality of home links.

For the case illustrated in FIG. 21, the UE first configures an address from a local access network. The UE detects that the UE is connected to a foreign link by running a home link detection mechanism, for example, the IKEv2 with the Home Agent during bootstrapping. The UE sends a Binding Update message over the foreign link to set up a Binding Cache entry in the Home Agent. The UE may specify the flow that the UE wants to direct to the foreign link in the Binding Update message. The Home Agent replies to the UE with a Binding Acknowledgement message to indicate the status of binding registration.

The UE then discovers and obtains an IP address from the second access network. By performing some home link detection mechanisms, the UE realizes that the UE is connected to the home link. Assume that the PMIP is used for the UE to establish network connectivity to the HA on this access network. The UE wants to keep network connectivity over both the foreign link and this home link, after finishing the PMIP based attach procedure, the UE sends a Binding Update message over the home link with the indication as described before to the Home Agent to request certain flow to be directed to the home link. The Home Agent uses the home address/MN identifier and the access type and optionally the linker layer address to identify the PMIP Binding Cache entry. After the Home Agent processes such Binding Update message, the Home Agent modifies the corresponding PMIP Binding Cache entry for the UE. In such Binding Cache entry, there is a flag indicating that this is a PMIP Binding Cache entry, the care-of address field is set as the MAG's care-of address, the flow information, the access type and the link layer address for the interface used on the access network. The Home Agent replies to the UE with a Binding Acknowledgement message to indicate the status of binding registration.

The UE then discovers and obtains an IP address from the third access network. By performing a home link detection mechanism, the UE realizes that the UE is connected to the home link. If the PMIP is used for the UE to establish network connectivity to the HA on this access network, the rest of the procedure is the same as discussed in the paragraph above.

Otherwise, GTP can be used. The UE wants to keep network connectivity over both the foreign link and this home link, after finishing the GTP based attach procedure, the UE sends a Binding Update message over the GTP based home link with the indication as described before to the Home Agent to request certain flow to be directed to this home link. By looking up the Binding Cache by using the home address or the MN identifier, and the access type and/or the layer 2 address, the Home Agent cannot find a matching Binding Cache entry, because the GTP attachment does not create a Binding Cache entry. Therefore, after the Home Agent processes such Binding Update message, the Home Agent creates a Binding Cache entry for the UE. In such Binding Cache entry, there is a flag indicating that this cache entry is for the GTP based home link, the care-of address field contains the information of GTP user plane traffic forwarding or the pointer to such information, the associated flow information, the access type and the link layer address for the interface used on the access network. The Home Agent replies to the UE with a Binding Acknowledgement message to indicate the status of binding registration.

With this approach, the UE can create and modify the flow information over any link, even for the flow associated with a different link since the UE knows the flow identification associated with each link. The Home Agent can use the combination of the home address/MN identifier, the Flow identification, the access type and the layer 2 address to locate the Binding Cache entry. In case that the UE connects to either GTP or PMIP based home link first and then connects to a foreign link, the procedure and the Binding Cache entries are similar with what is described above. The solution described in the scenario 1 and FIG. 14 applies to this scenario also.

HA/PGW Binding Cache Establishment Through Non-Home Link

In one implementation, for scenario 2, to create or modify the flow binding for the home link and the foreign link, the UE sends the Binding Update message over the foreign link or over the home link when de-registering the Binding Cache entry for the foreign link. There are no differences from what is described before in the this implementation and that described in connection with scenario 1. In particular, the solution described in the scenario 1 and FIG. 14 applies to this scenario also.

Routing Configuration Based on Security Establishment

In one implementation, for scenario 2, the UE uses the IKEv2 information exchange to set up flow binding for the home links. In one implementation, there is no difference from what is described before in IETF draft draft-ietf-mext-flow-binding-00.

Figure 22:
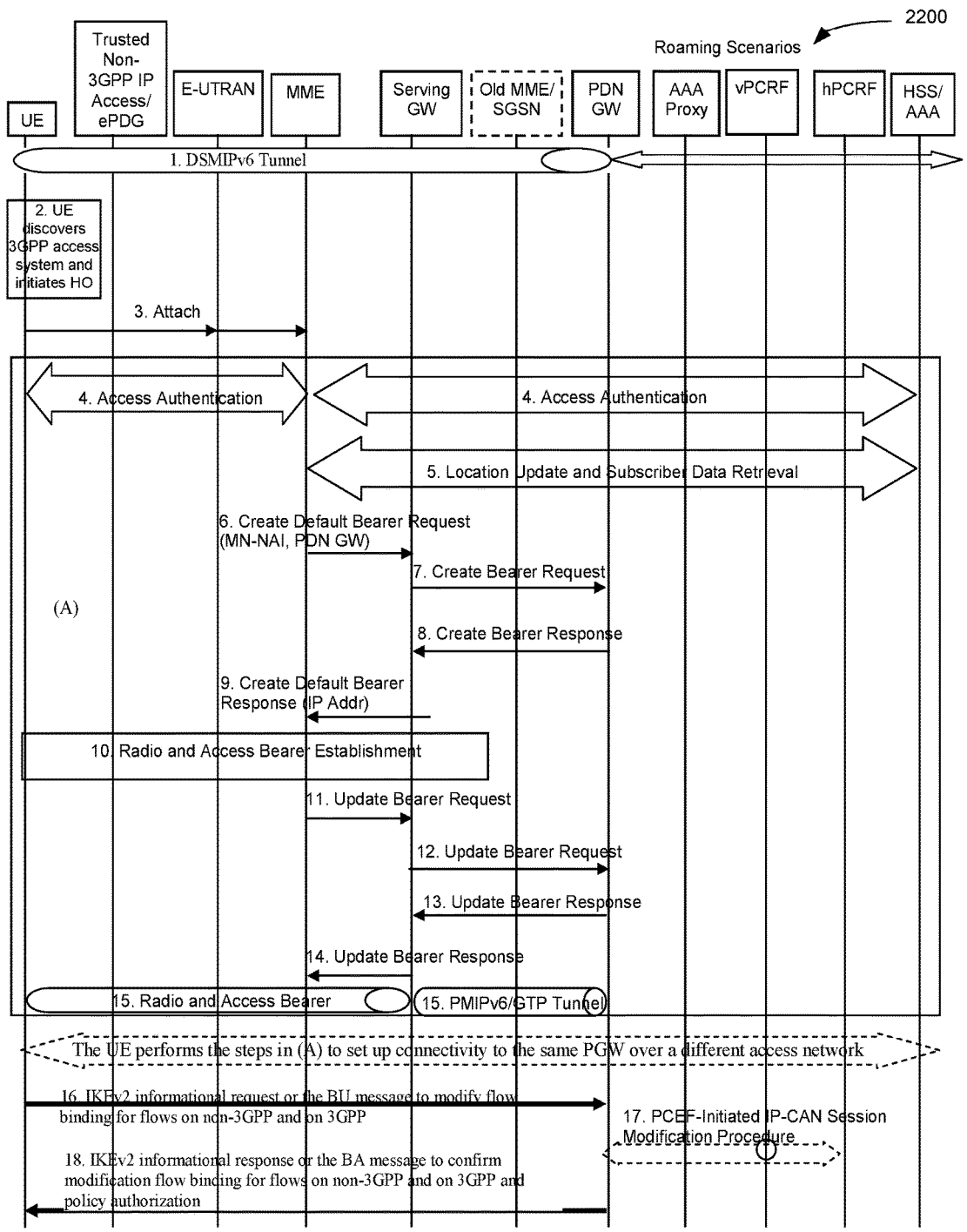
FIG. 22 illustrates a handover procedure in accordance with one implementation.

FIG. 22 illustrates a modified handover procedure 2200 in accordance with one implementation. The handover procedure 2200 includes a modified attach indication and PCC interactions when there are two home links and one foreign link. The steps involved in FIG. 22 are discussed below.

Steps 1 to 15 are the same as described in connection with FIG. 14. In step 16, the steps in (A) are performed for the UE to set up connectivity to the same PDN GW over another access network which is the home link for the UE. The UE sends either a Binding Update message or an IKEv2 informational request message to the PDN GW (on the non-3GPP link or on the home link) to modify the flow binding and create the BCE flow binding for the flows to be sent over the home link accesses (i.e., directly routed to the HoA). The UE does not exchange traffic over the new home links until the Binding Acknowledgement message or the IKEv2 information reply message are received.

In step 17, the PDN GW executes a PCEF-Initiated IP CAN Session Modification Procedure with the PCRF to obtain the rules required for the PDN GW in the VPLMN or HPLMN to function as the PCEF for all the active sessions the UE has established with the new IP-CAN type as a result of the handover procedure. The PDN GW also indicates which IP Flows are using IP-CAN=3GPP and which are using IP-CAN=non-3GPP. The PDN GW may receive confirmation of the modification and that the flows moved to the 3GPP access are allowed, or may get an error message that indicates the UE is not allowed to move the flows. In step 18, the PDN GW returns a Binding Ack message or an IKEv2 informational reply message to the UE. The UE in such case needs to know that the UE has to disconnect from the 3GPP access. The UE does so when receiving from the PDN GW a reply with a rejection code (e.g., a new "not allowed or failed" rejection code). Otherwise, the UE is allowed to route the flows over the new access.

Scenario 3: UE Connected to Two Home Links

In this case, the UE simultaneously connects to two home links, either two PMIP based home links or one GTP based and one PMIP based home link. If the UE is capable of DSMIPv6, the UE can modify the BCE entries and the mapping of flows towards either the PMIP link or the GTP link (or one of the two PMIP links) by sending Binding Update messages over one of the links.

This section focuses on the case where the UE does not support the DSMIPv6. Therefore, the UE needs to provide the flow information by extending the Router solicitation message or the DHCP request message (including DHCP information request message) or the GTP message exchanged during attach procedure. Such extensions could be new payloads or fields in the Router solicitation message or the DHCP message, or new PCOs (Protocol Configuration Options) in GTP messages containing the flow description and the flow identification. The Router Advertisement message and the DHCP reply message (including DHCP information reply message) need to be extended to return the status of processing such request to the UE.

In the GTP based 3GPP access network, the UE can communicate with the PDN GW (that performs the function of the LMA) directly by using the extended DHCP request message and the Router Solicitation message after attach. Or the UE provides such information in the PCOs in the GTP message during attach. The PDN GW returns the extended Router Advertisement message and the DHCP reply message to the UE to indicate the status.

In the PMIP based 3GPP access network, there are three methods. First, since the serving gateway is the DHCP relay and the PDN GW is the DHCP server, after attach, the extended DHCP request message can be sent by the UE to the serving gateway and then forwarded to the PDN GW. The status will be returned to the UE in the extended DHCP reply message. Second, the serving gateway can also receive the Router solicitation message. Therefore, after attach, the UE can send the extended Router Solicitation message to trigger the serving gateway to send a Proxy Binding Update message, which carries the flowing description and the flow identification information together with additional information provided by the UE, such as access network type and the link layer address, to the PDN GW. Third, the UE provides such information in the PCOs during attach which triggers the serving gateway to carry such information in the Proxy Binding Update message to the PDN GW. In the last two methods, after receiving and processing the PBU message, the PDN GW returns the status in a Proxy Binding Acknowledgement (PBA) message to the serving gateway and the serving gateway returns such status in the extended Router Advertisement message (the second method) or in the PCOs (the third method) to the UE. In case that PCOs are used to carry the flow information, the PCC interaction is performed at the same steps shown in FIG. 8.

In the PMIP based non-3GPP access network, the UE can send the extended Router Solicitation message or the DHCP request message that carry the flowing description and the flow identification information together with additional information provided by the UE, such as access network type and the link layer address. Such messages will be received by the Mobile Access Gateway (MAG) and the MAG forwards such information to the PDN GW (the Local Mobility Anchor, or LMA) in the Proxy Binding Update (PBU) message. After receiving the PBU message, the PDN GW creates or updates the PMIP Binding Cache entry and sends back a Proxy Binding Acknowledgement (PBA) message to indicate the status to the MAG. MAG finally forwards such status to the UE in the extended Router Advertisement message or DHCP reply message.

Figure 23:
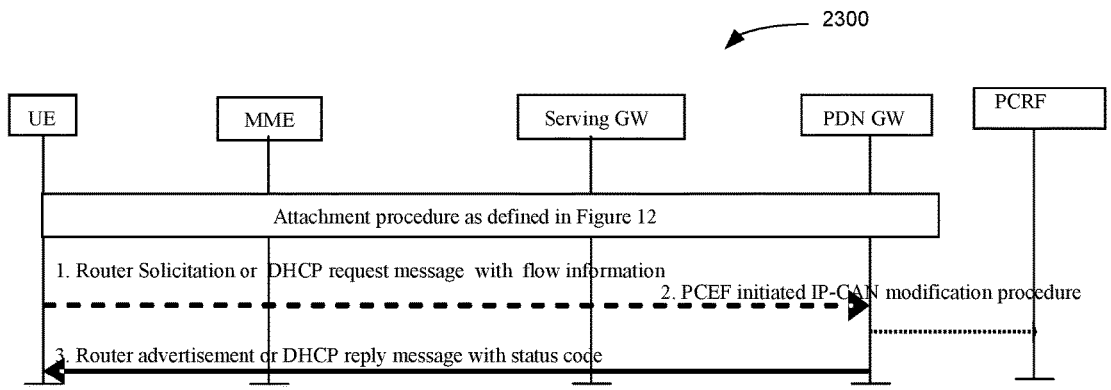
FIG. 23 illustrates a procedure for using DHCP or Router solicitation/Advertisement messages to convey flow information when GTP is used.

FIG. 23 illustrates a procedure 2300 for using DHCP or Router solicitation/Advertisement messages to convey flow information when GTP is used. The steps involved in procedure 2300 are discussed below.

Figure 8:
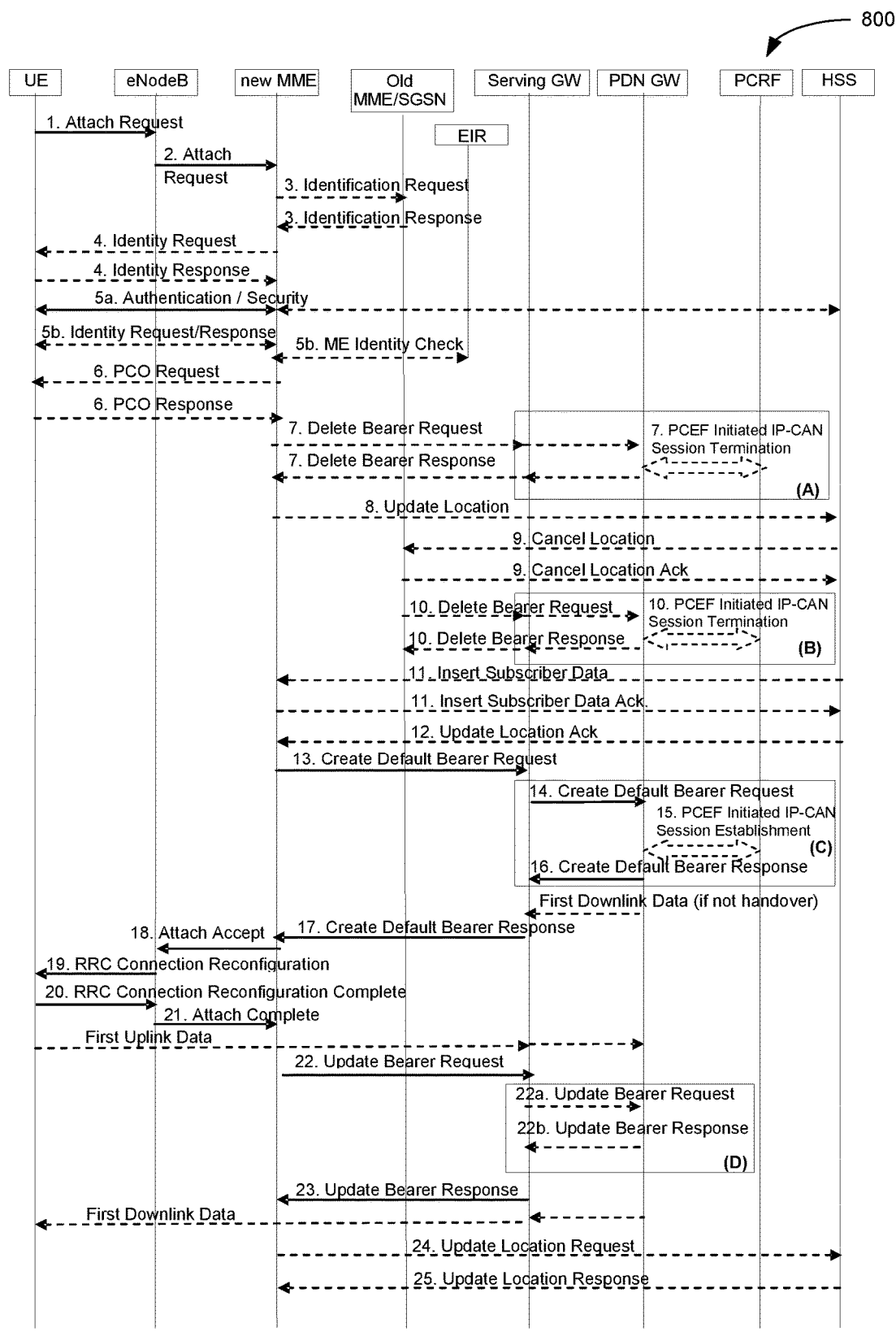
FIG. 8 illustrates a handover procedure in accordance with one implementation.
Figure 9:
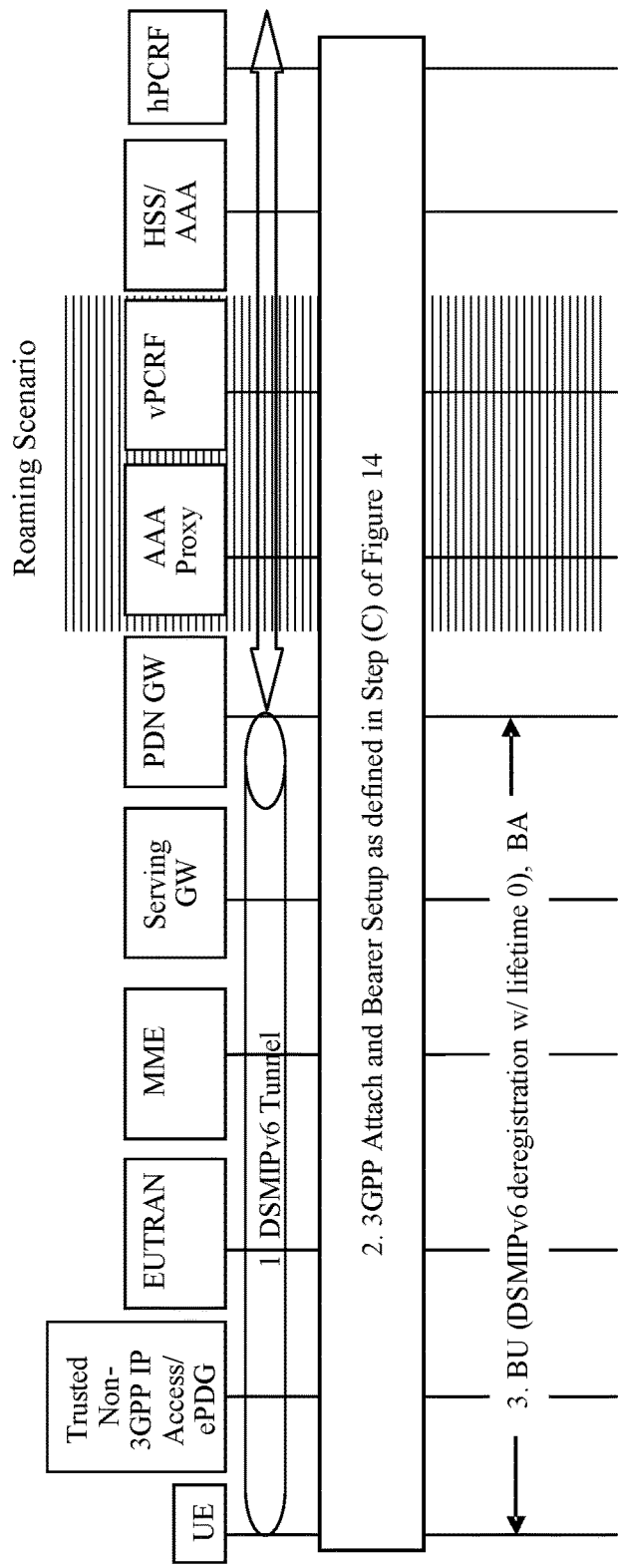
FIG. 9 illustrates a handover procedure in accordance with one implementation.

In step 1, the attach procedure is performed as described in connection with FIG. 8. Then the UE sends the RS or DHCP request message with the flow information to the PDN GW. In step 2, the PDN GW executes a PCEF-Initiated IP CAN Session Modification Procedure with the PCRF to obtain the rules required for the PDN GW in the VPLMN or HPLMN to function as the PCEF for all the active sessions the UE has established with the new IP-CAN type as a result of the handover procedure. The PDN GW also indicates which IP Flows are using IP-CAN=3GPP and which are using IP-CAN=non-3GPP. The PDN GW may receive confirmation of the modification and that the flows moved to the 3GPP access are allowed, or may get an error message that indicates the UE is not allowed to move the flows.

In step 3, the PDN GW returns either a RA message or a DHCP reply message to the UE. The UE in such case needs to know that it has to disconnect from the 3GPP access. The UE does so when receiving from the PDN GW a reply with a rejection code (e.g., a new "not allowed or failed" rejection code). Otherwise, the UE is allowed to route the flows over the new access.

Figure 24:
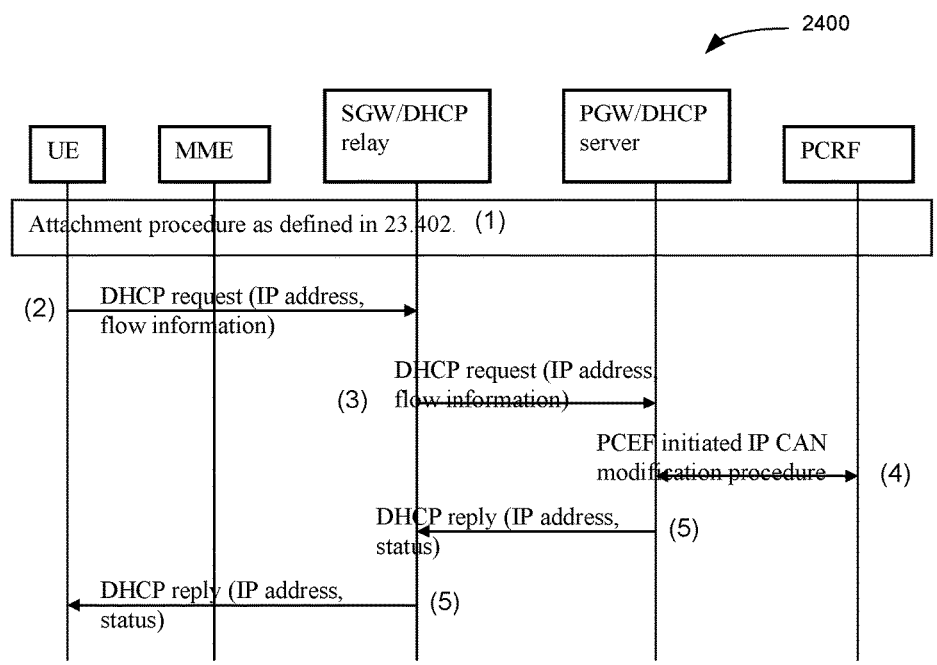
FIG. 24 illustrates a procedure in which DHCP messages are used to convey the flow information when PMIP is used.

FIG. 24 illustrates a procedure 2400 in which DHCP messages are used to convey the flow information when PMIP is used. The steps involved in procedure 2400 are discussed below.

In step 1, the attach procedure is performed as described in TS 23.402. Then the UE sends the DHCP request message with the flow information to the serving GW. In step 2, the serving GW as a DHCP relay forwards such DHCP request message to the PDN GW. In step 3, the PDN GW executes a PCEF-Initiated IP CAN Session Modification Procedure with the PCRF to obtain the rules required for the PDN GW in the VPLMN or HPLMN to function as the PCEF for all the active sessions the UE has established with the new IP-CAN type as a result of the handover procedure. The PDN GW also indicates which IP Flows are using IP-CAN=3GPP and which are using IP-CAN=non-3GPP.

The PDN GW may receive confirmation of the modification and that the flows moved to the 3GPP access are allowed, or may get an error message that indicates the UE is not allowed to move the flows.

In step 4, the PDN GW as a DHCP server returns a DHCP reply message to the Serving GW. In step 5, the Serving GW returns the DHCP reply to the UE. The UE in such case needs to know that it has to disconnect from the 3GPP access. The UE does so when receiving from the PDN GW a reply with a rejection code (e.g., a new "not allowed or failed" rejection code). Otherwise, the UE is allowed to route the flows over the new access.

Figure 25:
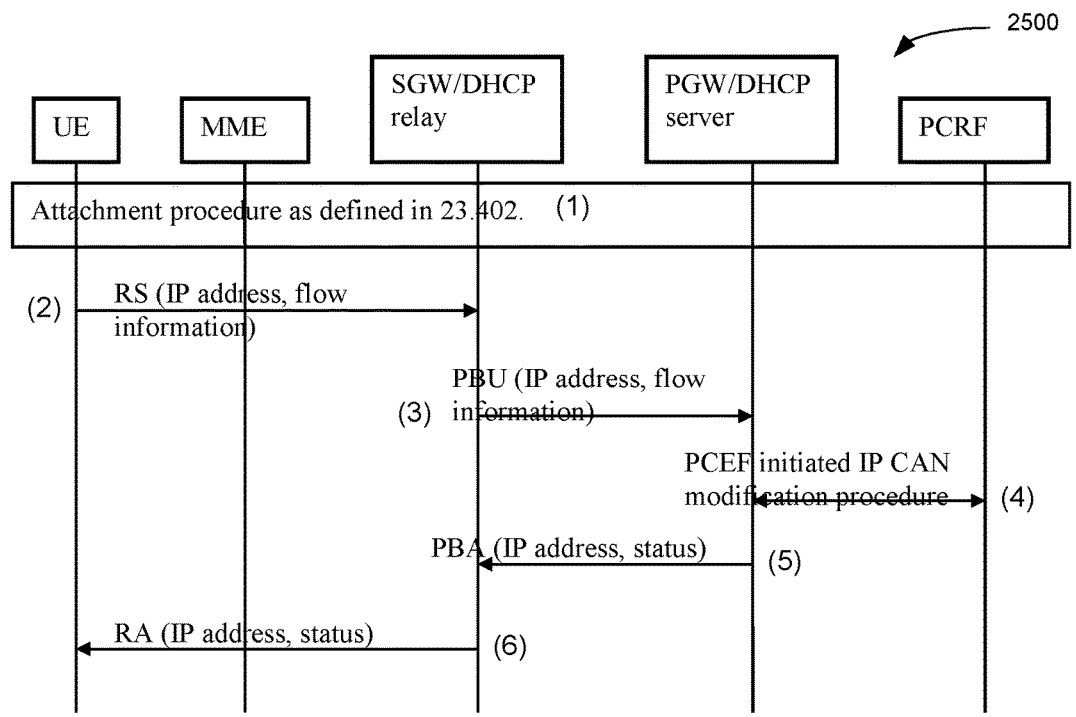
FIG. 25 illustrates a procedure when Route Solicitation/Router Advertisement messages are used to convey the flow information when PMIP is used.

FIG. 25 illustrates a procedure 2500 when Route Solicitation/Router Advertisement messages are used to convey the flow information when PMIP is used. The steps shown in procedure 2500 are described below.

In step 1, the attach procedure is performed as described in TS 23.402. Then the UE sends the Route Solicitation request message with the flow information to the serving GW. In step 2, the serving GW sends a PBU message to the PDN GW to update the flow information. In step 3, the PDN GW executes a PCEF-Initiated IP CAN Session Modification Procedure with the PCRF to obtain the rules required for the PDN GW in the VPLMN or HPLMN to function as the PCEF for all the active sessions the UE has established with the new IP-CAN type as a result of the handover procedure. The PDN GW also indicates which IP Flows are using IP-CAN=3GPP and which are using IP-CAN=non-3GPP. The PDN GW may receive confirmation of the modification and that the flows moved to the 3GPP access are allowed, or may get an error message that indicates the UE is not allowed to move the flows.

In step 4, the PDN GW returns a PBA message to the Serving GW. In step 5, based on the status code carried in the PBA message, the Serving GW returns the Router Advertisement message to the UE (step 6). The UE in such case needs to know that the UE has to disconnect from the 3GPP access. The UE does so when receiving a reply with a rejection code (e.g., a new "not allowed or failed" rejection code). Otherwise, the UE is allowed to route the flows over the new access.

One or more of the procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 26:
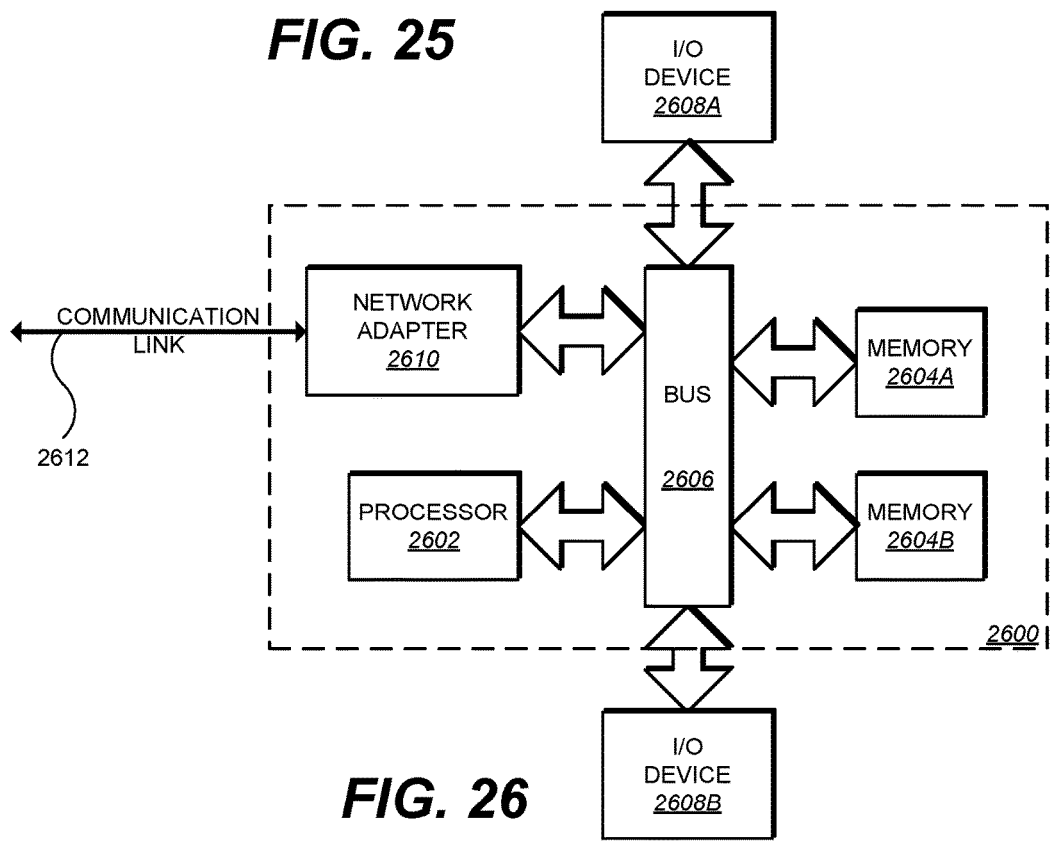
FIG. 26 is a block diagram of a data processing system suitable for storing and/or executing program code.

FIG. 26 illustrates a data processing system 2600 (e.g., a UE) suitable for storing and/or executing program code. Data processing system 2600 includes a processor 2602 coupled to memory elements 2604A-B through a system bus 2606. In other implementations, data processing system 2600 includes more than one processor and each processor can be coupled directly or indirectly to one or more memory elements through a system bus. Memory elements 2604A-B can include local memory employed during actual execution of the program code, bulk storage, and cache memories that provide temporary storage of at least some program code in order to reduce the number of times the code must be retrieved from bulk storage during execution. As shown, input/output or I/O devices 2608A-B (including, but not limited to, keyboards, displays, pointing devices, etc.) are coupled to data processing system 2600. I/O devices 2608A-B may be coupled to data processing system 2600 directly or indirectly through intervening I/O controllers (not shown).

In one implementation, a network adapter 2610 is coupled to data processing system 2600 to enable data processing system 2600 to become coupled to other data processing systems or remote printers or storage devices through communication link 2612. Communication link 2612 can be a private or public network. Modems, cable modems, and Ethernet cards are just a few of the currently available types of network adapters.

Although the subject matter has been described in language specific to structural features and/or methodological operations, the subject matter defined in the appended claims is not necessarily limited to the specific features or acts described above, including orders in which the acts are performed.

What is claimed is:

1. A method for routing packets from a home agent to a user equipment through a home link and a foreign link, the method comprising:

determining that the user equipment is connected to a home link for the user equipment;

transmitting a binding update message from the user equipment over the home link to the home agent, the binding update message including at least a first flow identifier and a second flow identifier, the transmission of the binding update message effective to:

create, at the home agent and based on the first flow identifier, a first binding cache entry in which a first binding identifier for a home address of the user equipment is associated with the first flow identifier, the first flow identifier identifying a first flow of packets that is to be communicated, via the home link, between the user equipment and the home agent, and create, at the home agent and based on the second flow identifier, a second binding cache entry in which a second binding identifier for the home address of the user equipment is associated with the second flow identifier, the second flow identifier identifying a second flow of packets that is to be communicated via the foreign link, between the user equipment and the home agent;

receiving, at the user equipment, a first plurality of the packets transmitted by the home agent through the home link in accordance with the first binding cache entry; and receiving, at the user equipment, second plurality of packets transmitted by the home agent through the foreign link in accordance with the second binding cache entry.

2. The method of claim 1, wherein:
receiving, at the user equipment, the first plurality of packets transmitted by the home agent through the home link; and
receiving, at the user equipment, the second plurality of packets transmitted by the home agent through the foreign link further comprises:
simultaneously receiving, at the user equipment from the home agent, the first plurality of packets through the home link and the second plurality of packets through the foreign link.

3. The method of claim 1, wherein the first plurality of packets is included in the first flow of packets that is transmitted, through the home link, between the home agent and the user equipment.

4. The method of claim 1, wherein the second plurality of packets is included in the second flow of packets that is transmitted, through the foreign link, between the home agent and the user equipment.

5. The method of claim 1, wherein the first binding cache entry includes a care-of address field that is set to a dummy value to indicate that the first flow of packets is to be transmitted via the home link.

6. The method of claim 1, wherein the first binding cache entry includes a care-of address field that is set to a home address assigned to the user equipment to indicate that the first flow of packets is to be transmitted through the home link.

7. The method of claim 1, further comprising:
in response to transmitting the binding update message from the user equipment over the home link to home agent effective to create the first binding cache entry and the second binding cache entry at the home agent, receiving a binding acknowledgement acknowledging a binding registration at the home agent.

8. The method of claim 1, wherein the foreign link is a 3rd Generation Partnership Project (3GPP) access network.

9. The method of claim 1, wherein the second binding cache entry includes a care-of address field that is set to one of:
a first dummy value that is different from the home address associated with the user equipment; or
a second dummy value to indicate that the second flow of packets is to be transmitted via the home link.

10. An apparatus comprising a user equipment configured to:
determine that the user equipment is connected to a home link for the user equipment;
transmit a binding update message over the home link to the home agent, the binding update message including at least a first flow identifier and a second flow identifier, the transmission of the binding update message effective to:
create, at the home agent and based on the first flow identifier, a first binding cache entry in which a first binding identifier for a home address of the user equipment is associated with the first flow identifier, the first flow identifier identifying a first flow of packets that is to be communicated, via the home link, between the user equipment and the home agent, and
create, at the home agent and based on the second flow identifier, a second binding cache entry in which a second binding identifier for the home address of the user equipment is associated with the second flow identifier, the second flow identifier identifying a second flow of packets that is to be communicated via a foreign link, between the user equipment and the home agent;
receive, at the user equipment, a first plurality of the packets transmitted by the home agent through the home link in accordance with the first binding cache entry; and
receive, at the user equipment, a second plurality of packets transmitted by the home agent through the foreign link in accordance with the second binding cache entry.

11. The apparatus of claim 10, wherein the user equipment is configured to simultaneously receive, at the user device and from the home agent, the first plurality of packets transmitted by the home agent through the home link and the second plurality of packets transmitted by the home agent through the foreign link.

12. The apparatus of claim 10, wherein the first plurality of packets is included in the first flow of packets that is transmitted, through the home link, between the home agent and the user equipment.

13. The apparatus of claim 10, wherein the second plurality of packets is included in the second flow of packets that is transmitted, through the foreign link, between the home agent and the user equipment.

14. The apparatus of claim 10, wherein the first binding cache entry includes a care-of address field that is set to one of:
a first dummy value that is different from the home address associated with the user equipment; or
a second dummy value to indicate that the first flow of packets is to be transmitted via the home link.

15. The apparatus of claim 10, wherein the second binding cache entry include a care-of address field that is set to a home address assigned to the user equipment to indicate that the first flow of packets is to be transmitted via the home link.

16. The apparatus of claim 10, wherein the user equipment is further configured to:
in response to transmission of the binding update message over the home link to the home agent effective to create the first binding cache entry and the second binding cache entry at the home agent,
receive a binding acknowledgement acknowledging a binding registration at the home agent.

17. The apparatus of claim 10, wherein the foreign link is a 3rd Generation Partnership Project (3GPP) access network.

* * * * *